(12) United States Patent
Wada

(10) Patent No.: US 7,898,744 B2
(45) Date of Patent: Mar. 1, 2011

(54) CLOSE-UP LENS, IMAGING APPARATUS, AND METHOD FOR FOCUSING CLOSE-UP LENS

(75) Inventor: Mitsuaki Wada, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/048,198

(22) Filed: Mar. 13, 2008

(65) Prior Publication Data
US 2008/0225406 A1    Sep. 18, 2008

(30) Foreign Application Priority Data

Mar. 14, 2007 (JP) ................. 2007-065400
Feb. 15, 2008 (JP) ................. 2008-034053

(51) Int. Cl.
*G02B 15/14* (2006.01)
(52) U.S. Cl. .......... 359/686; 359/771; 359/772; 359/773
(58) Field of Classification Search .......... 359/771–773, 359/686
See application file for complete search history.

(56) References Cited

U.S. PATENT DOCUMENTS

| 5,889,619 A * | 3/1999 | Ozaki et al. ................ 359/688 |
| 6,118,593 A | 9/2000 | Tochigi |
| 6,891,684 B2 | 5/2005 | Taki |
| 7,218,457 B2 | 5/2007 | Sensui |
| 2004/0017617 A1 * | 1/2004 | Taki ................ 359/773 |

FOREIGN PATENT DOCUMENTS

| EP | 0628844 A1 | 12/1994 |
| JP | 04-110811 A | 4/1992 |
| JP | 2004-061680 A | 2/2004 |
| JP | 2005-004041 A | 1/2005 |
| JP | 2006-106112 A | 4/2006 |
| JP | 2006-153942 A | 6/2006 |
| JP | 2006-171432 A | 6/2006 |

\* cited by examiner

*Primary Examiner* — Ricky L Mack
*Assistant Examiner* — James R Greece
(74) *Attorney, Agent, or Firm* — Miles & Stockbridge P.C.

(57) ABSTRACT

Providing a close-up lens with superb optical performance capable of focusing from infinity to a close distance allowing a life-size magnification by an internal focusing system with small moving amounts of focusing lens groups, an imaging apparatus, and a method for focusing a close-up lens. The close-up lens includes four lens groups, and is able to focus an object with an imaging magnification from $\beta=0$ through at least $\beta=-0.5$, wherein upon focusing, a first lens group and a fourth lens group are fixed with respect to an image plane, and a second lens group and a third lens group are moved along an optical axis.

9 Claims, 17 Drawing Sheets

CLOSE-UP LENS, IMAGING APPARATUS, AND METHOD FOR FOCUSING CLOSE-UP LENS

The disclosure of the following priority application is herein incorporated by reference:
Japanese Patent Application No. 2007-065400; and
Japanese Patent Application No. 2008-034053.

BACKGROUND OF THE INVENTION

1. Field of the Invention

The present invention relates to a close-up lens, and in particular to a close-up lens with an internal focusing system having a constant total lens length, an imaging apparatus, and a method for focusing a close-up lens.

2. Related Background Art

A photo-taking lens for a close-up photograph has been proposed in, for example, Japanese Patent Application Laid-Open No. 2005-004041. Unlike an ordinary photo-taking lens, a close-up lens has to focus an object locating from infinity to a close distance allowing a life-size magnification or in the vicinity thereof, so that moving amounts of lens groups upon focusing necessarily become large. Accordingly, it is unsuitable for auto focus. When you try to focus from infinity to a close distance providing a life-size magnification by extending the whole lens system in a body, you have to move it a distance same as the focal length thereof. On this occasion, since variations in spherical aberration and the image plane cannot be suppressed, a lot of lenses have adopted a floating system in which moving speed of a portion of lens group differs from that of the whole lens system.

However, even a close-up lens with a floating system has still had a large moving amount of the lens group, so that it is unsuited for auto focus.

SUMMARY OF THE INVENTION

The present invention is made in view of the aforementioned problems and has an object to provide a close-up lens with superb optical performance capable of focusing from infinity to a close distance allowing a life-size magnification by an internal focusing system with small moving amounts of focusing lens groups, an imaging apparatus, and a method for focusing a close-up lens.

According to a first aspect of the present invention, there is provided a close-up lens comprising four lens groups, and capable of focusing an object with an imaging magnification from $\beta=0$ through at least $\beta=-0.5$; wherein upon focusing, a first lens group and a fourth lens group are fixed with respect to an image plane, and a second lens group and a third lens group are moved along an optical axis.

In a close-up lens according to the first aspect of the present invention, it is preferable that at least one aspherical surface is included in the close-up lens.

In a close-up lens according to the first aspect of the present invention, it is preferable that the first lens group is composed of three lenses or less.

In a close-up lens according to the first aspect of the present invention, it is preferable that the fourth lens group is composed of at least three lenses or more.

In a close-up lens according to the first aspect of the present invention, it is preferable that the first lens group includes at least one aspherical surface.

In a close-up lens according to the first aspect of the present invention, it is preferable that the second lens group includes at least one aspherical surface.

According to a second aspect of the present invention, there is provided a close-up lens comprising four lens groups, and capable of focusing an object with an imaging magnification from $\beta=0$ through at least $\beta=-1.0$; wherein upon focusing, a first lens group and a fourth lens group are fixed with respect to an image plane, and a second lens group and a third lens group are moved along an optical axis; and the following conditional expressions being satisfied:

$$1.5<\beta 0<2.3$$

$$0.3<\beta 1<0.9$$

where $\beta 0$ denotes a lateral magnification of the second lens group upon focusing on infinity, and $\beta 1$ denotes a lateral magnification of the second lens group upon an imaging magnification $\beta=-1.0$.

In a close-up lens according to the second aspect of the present invention, it is preferable that at least one aspherical surface is included in the close-up lens.

In a close-up lens according to the second aspect of the present invention, it is preferable that the first lens group is composed of three lenses or less.

In a close-up lens according to the second aspect of the present invention, it is preferable that the fourth lens group is composed of at least three lenses or more.

In a close-up lens according to the second aspect of the present invention, it is preferable that the first lens group includes at least one aspherical surface.

In a close-up lens according to the second aspect of the present invention, it is preferable that the second lens group includes at least one aspherical surface.

According to a third aspect of the present invention, there is provided an imaging apparatus equipped with the close-up lens according to the first aspect.

According to a fourth aspect of the present invention, there is provided an imaging apparatus equipped with the close-up lens according to the second aspect.

According to a fifth aspect of the present invention, there is provided a method for focusing a close-up lens capable of focusing an object with an imaging magnification from $\beta=0$ through at least $\beta=-0.5$, the method comprising steps of: providing the close-up lens including four lens groups; fixing a first lens group and a fourth lens group with respect to an image plane upon focusing; and moving a second lens group and a third lens group along an optical axis upon focusing.

In a fifth aspect of the present invention, it is preferable to further include a step of: including at least one aspherical surface in the close-up lens.

According to a sixth aspect of the present invention, there is provided a method for focusing a close-up lens capable of focusing an object with an imaging magnification from $\beta=0$ through at least $\beta=-1.0$, the method comprising steps of: providing the close-up lens including four lens groups; satisfying the following conditional expressions; fixing a first lens group and a fourth lens group with respect to an image plane upon focusing; and moving a second lens group and a third lens group along an optical axis upon focusing:

$$1.5<\beta 0<2.3$$

$$0.3<\beta 1<0.9$$

where $\beta 0$ denotes a lateral magnification of the second lens group upon focusing on infinity, and $\beta 1$ denotes a lateral magnification of the second lens group upon the imaging magnification $\beta=-1.0$.

In a sixth aspect of the present invention, it is preferable to further include a step of: including at least one aspherical surface in the close-up lens.

The present invention makes it possible to provide an internal focusing close-up lens having an angle of view from about 37 degrees to 45 degrees, and an f-number of about 2.8 suitable for an optical instrument such as a film camera, an electronic still camera, and the like, capable of focusing by auto focus from infinity to a close distance allowing a life-size magnification with high optical performance.

BRIEF DESCRIPTION OF THE DRAWINGS

FIGS. 2A, 2B, 2C are graphs showing various aberrations of the close-up lens according to Example 1, in which FIG. 2A is in a state focusing on infinity, FIG. 2B is in a state where an imaging magnification $\beta=-0.5$, and FIG. 2C is in a state where an imaging magnification $\beta=-1.0$.

FIGS. 4A, 4B, 4C are graphs showing various aberrations of the close-up lens according to Example 2, in which FIG. 4A is in a state focusing on infinity, FIG. 4B is in a state where an imaging magnification $\beta=-0.5$, and FIG. 4C is in a state where an imaging magnification $\beta=-1.0$.

FIGS. 6A, 6B, 6C are graphs showing various aberrations of the close-up lens according to Example 3, in which FIG. 6A is in a state focusing on infinity, FIG. 6B is in a state where an imaging magnification $\beta=-0.5$, and FIG. 6C is in a state where an imaging magnification $\beta=-1.0$.

FIGS. 8A, 8B, 8C are graphs showing various aberrations of the close-up lens according to Example 4, in which FIG. 8A is in a state focusing on infinity, FIG. 8B is in a state where an imaging magnification $\beta=-0.5$, and FIG. 8C is in a state where an imaging magnification $\beta=-1.0$.

FIGS. 10A, 10B, 10C are graphs showing various aberrations of the close-up lens according to Example 5, in which FIG. 10A is in a state focusing on infinity, FIG. 10B is in a state where an imaging magnification $\beta=-0.5$, and FIG. 10C is in a state where an imaging magnification $\beta=-1.0$.

FIGS. 12A, 12B, 12C are graphs showing various aberrations of the close-up lens according to Example 6, in which FIG. 12A is in a state focusing on infinity, FIG. 12B is in a state where an imaging magnification $\beta=-0.5$, and FIG. 12C is in a state where an imaging magnification $\beta=-1.0$.

FIGS. 14A, 14B, 14C are graphs showing various aberrations of the close-up lens according to Example 7, in which FIG. 14A is in a state focusing on infinity, FIG. 14B is in a state where an imaging magnification $\beta=-0.5$, and FIG. 14C is in a state where an imaging magnification $\beta=-1.0$.

FIGS. 16A, 16B, 16C are graphs showing various aberrations of the close-up lens according to Example 8, in which FIG. 16A is in a state focusing on infinity, FIG. 16B is in a state where an imaging magnification $\beta=-0.5$, and FIG. 16C is in a state where an imaging magnification $\beta=-1.0$.

DETAILED DESCRIPTION OF THE MOST PREFERRED EMBODIMENT

Figure 1:
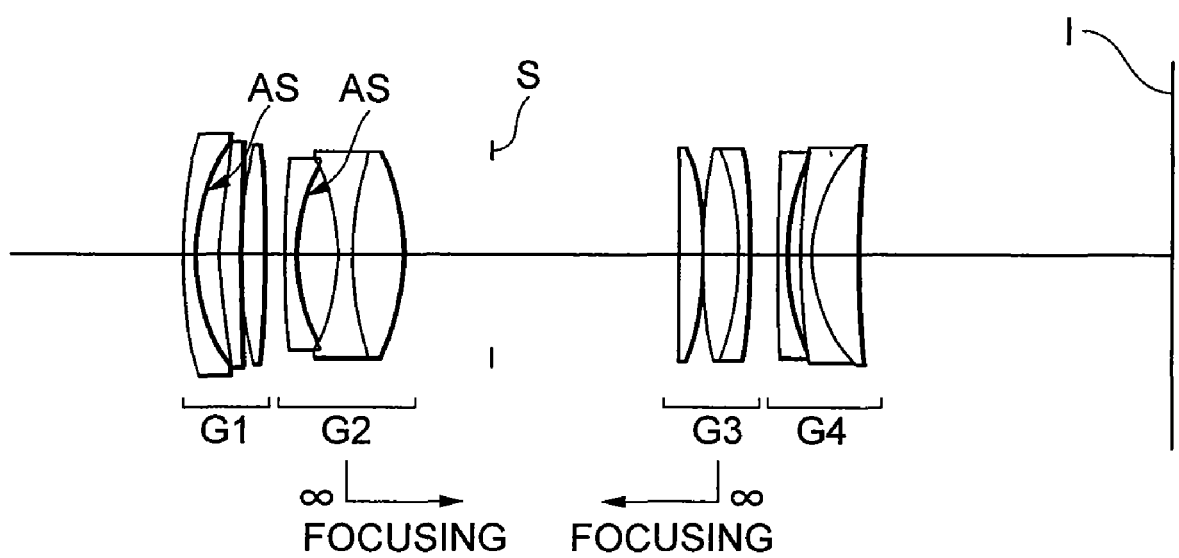
FIG. 1 is a cross-sectional view showing a lens configuration of a close-up lens according to Example 1 upon focusing on infinity.

A close-up lens according to the present embodiment is going to be explained below.

A close-up lens according to the present embodiment includes four lens groups and is capable of focusing an object with an imaging magnification from $\beta=0$ through at least $\beta=-0.5$, wherein upon focusing, a first lens group and a fourth lens group are fixed with respect to an image plane, and a second lens group and a third lens group are moved along an optical axis. With this lens configuration, it becomes possible to take a close-up photograph with a large imaging magnification. In this case, the imaging magnification $\beta=0$ is a state upon focusing on infinity.

Moreover, a close-up lens according to the present embodiment includes four lens groups and is capable of focusing an object with an imaging magnification from $\beta=0$ through at least $\beta=-1.0$, wherein upon focusing, a first lens group and a fourth lens group are fixed with respect to an image plane, and a second lens group and a third lens group are moved along an optical axis, and the following conditional expressions (1) and (2) are satisfied:

$$1.5<\beta0<2.3 \qquad (1)$$

$$0.3<\beta1<0.9 \qquad (2)$$

where $\beta0$ denotes a lateral magnification of the second lens group upon focusing on infinity, and $\beta1$ denotes a lateral magnification of the second lens group upon an imaging magnification $\beta=-1.0$.

Conditional expression (1) defines an appropriate range of the lateral magnification of the second lens group upon focusing on infinity. When the value $\beta0$ is equal to or exceeds the upper limit of conditional expression (1), the focal length of the second lens group becomes short, so that spherical aberration and curvature of field are both overcorrected.

On the other hand, when the value $\beta0$ is equal to or falls below the lower limit of conditional expression (1), the focal length of the second lens group becomes long, and both of spherical aberration and curvature of field become undercorrected, so that it is undesirable.

In order to secure the effect of the present embodiment, it is preferable to set the upper limit of conditional expression (1) to 2.10. In order to secure the effect of the present embodiment, it is preferable to set the lower limit of conditional expression (1) to 1.70.

Conditional expression (2) defines an appropriate range of a moving amount of the second lens group upon an imaging magnification $\beta=-1.0$. When the value $\beta1$ is equal to or exceeds the upper limit of conditional expression (2), a combined focal length of the first lens group and the second lens group upon the imaging magnification $\beta=-1.0$ becomes short, so that variation in various aberrations such as spherical aberration upon the imaging magnification from $\beta=0$ to $\beta=-1.0$ cannot be suppressed.

On the other hand, when the value β1 is equal to or falls below the lower limit of conditional expression (2), a combined focal length of the first lens group and the second lens group upon the imaging magnification β=−1.0 becomes long, both of spherical aberration and curvature of field become undercorrected, so that it is undesirable.

In order to secure the effect of the present embodiment, it is preferable to set the upper limit of conditional expression (2) to 0.8. In order to secure the effect of the present embodiment, it is preferable to set the lower limit of conditional expression (2) to 0.5.

A close-up lens according to the present embodiment preferably includes at least one aspherical surface.

With constructing in such a manner, it becomes possible to excellently correct various aberrations such as spherical aberration and coma.

In a close-up lens according to the present embodiment, the first lens group is preferably composed of three lenses or less.

With constructing in such a manner, it becomes possible to secure a wide moving space for the second lens group with correcting spherical aberration and coma, so that variation in various aberrations such as spherical aberration upon focusing can be suppressed.

In a close-up lens according to the present embodiment, the fourth lens group is preferably composed of at least three lenses or more.

With constructing in such a manner, it becomes possible to excellently correct various aberrations such as curvature of field.

In a close-up lens according to the present embodiment, it is preferable that the first lens group includes at least one aspherical surface and the second lens group includes at least one aspherical surface.

With constructing in such a manner, it becomes possible to excellently correct various aberrations such as spherical aberration and coma.

A method for focusing a close-up lens capable of focusing an object with an imaging magnification from β=0 through at least β=−0.5 according to the present embodiment, the method comprising steps of: providing the close-up lens including four lens groups; fixing a first lens group and a fourth lens group with respect to an image plane upon focusing; and moving a second lens group and a third lens group along an optical axis upon focusing.

With this method for focusing, it becomes possible to obtain excellent images with an imaging magnification from β=0 to at least β=−0.5.

A method for focusing a close-up lens according to the present embodiment includes steps of: providing the close-up lens including four lens groups; satisfying the following conditional expressions (1) and (2); fixing a first lens group and a fourth lens group with respect to an image plane upon focusing; and moving a second lens group and a third lens group along an optical axis upon focusing:

$$1.5 < \beta 0 < 2.3 \quad (1)$$

$$0.3 < \beta 1 < 0.9 \quad (2)$$

where β0 denotes a lateral magnification of the second lens group upon focusing on infinity, and β1 denotes a lateral magnification of the second lens group upon an imaging magnification β=−1.0.

With this method for focusing, it becomes possible to obtain excellent images with focusing from infinity to a close distance allowing a life-size magnification.

A close-up lens according to each Example of the present embodiment is explained below with reference to accompanying drawings.

EXAMPLE 1

FIG. 1 is a cross-sectional view showing a lens configuration of a close-up lens according to Example 1 upon focusing on infinity.

As shown in FIG. 1, the close-up lens according to Example 1 is composed of, in order from an object, a first lens group G1 having positive refractive power, a second lens group G2 having negative refractive power, an aperture stop S, a third lens group G3 having positive refractive power, and a fourth lens group G4 having negative refractive power. Upon focusing from infinity to a close distance allowing a life-size magnification, the first lens group G1, the fourth lens group G4, and the aperture stop S are fixed with respect to an image plane I, the second lens group G2 is moved along an optical axis toward the image plane I, and the third lens group G3 is moved along the optical axis toward the object.

The first lens group G1 is composed of, in order from the object, a negative meniscus lens having a convex surface facing the object and an aspherical surface on the image side surface, a positive meniscus lens having a convex surface facing the object, and a double convex positive lens.

The second lens group G2 is composed of, in order from the object, a negative meniscus lens having a convex surface facing the object and an aspherical surface on the image side surface, and a cemented lens constructed by a double concave negative lens cemented with a double convex positive lens.

The third lens group G3 is composed of, in order from the object, a double convex positive lens, and a cemented lens constructed by a double convex positive lens cemented with a negative meniscus lens having a concave surface facing the object.

The fourth lens group G4 is composed of, in order from the object, a negative meniscus lens having a convex surface facing the object, and a cemented lens constructed by a negative meniscus lens having a convex surface facing the object cemented with a positive meniscus lens having a convex surface facing the object.

Various values associated with the close-up lens according to Example 1 are listed in Table 1.

In [Specifications], f denotes a focal length, FNO denotes an f-number, and Bf denotes a back focal length.

In [Lens Data], the first column "N" shows a lens surface number counted in order from the object side, the second column "r" shows a radius of curvature of the lens surface, the third column "d" shows a distance to the next lens surface along the optical axis, the fourth column "vd" shows Abbe number of the medium at d-line (wavelength λ=587.6 nm), and the fifth column "nd" shows refractive index of the medium at d-line (wavelength λ=587.6 nm). In the second column "r", "r=0.0000" denotes a plane surface. Refractive index of the air nd=1.000000 is omitted.

In [Aspherical Data], a surface number N, aspherical coefficients and conical coefficient are shown when an aspherical surface is exhibited by the following expression:

$$x = (h^2/r) / \left[ 1 + \{1 - \kappa (h/r)^2\}^{1/2} \right] + C4 \cdot h^4 + C6 \cdot h^6 + C8 \cdot h^8 + C10 \cdot h^{10}$$

where h denotes a vertical height from the optical axis, x denotes a sag amount which is a distance along the optical axis from the tangent surface at the vertex of the aspherical surface to the aspherical surface at the vertical height h from the optical axis, r denotes a radius of curvature of a reference sphere (paraxial radius of curvature), K denotes a conical coefficient, and C4, C6, C8, C10 denote aspherical coefficients. In [Aspherical Data], "E-n" denotes "×10$^{-n}$".

The explanation of reference symbols is the same in the other Examples, so that duplicated explanations are omitted.

TABLE 1

[Specifications]

| | |
|---|---|
| f = | 54.9 |
| FNO = | 2.88 |
| Bf = | 36.33 |

[Lens Data]

| N | r | d | νd | nd |
|---|---|---|---|---|
| 1) | 53.6481 | 1.2235 | 37.17 | 1.834000 |
| 2) | 23.7149 | 3.0444 | | |
| 3) | 55.1154 | 2.3000 | 55.43 | 1.677900 |
| 4) | 154.6254 | 0.0943 | | |
| 5) | 50.0781 | 2.7389 | 42.71 | 1.834807 |
| 6) | −176.5486 | D6 | | |
| 7) | 106.1229 | 1.1868 | 64.03 | 1.516120 |
| 8) | 19.4713 | 4.9300 | | |
| 9) | −25.1250 | 1.7346 | 36.30 | 1.620040 |
| 10) | 37.9551 | 5.8886 | 40.77 | 1.883000 |
| 11) | −30.3977 | D11 | | |
| 12> | 0.0000 | D12 | Aperture Stop S | |
| 13) | 316.1763 | 2.9215 | 82.56 | 1.497820 |
| 14) | −42.6285 | 0.0456 | | |
| 15) | 55.1820 | 4.3365 | 65.47 | 1.603000 |
| 16) | −38.7234 | 1.0955 | 23.78 | 1.846660 |
| 17) | −139.0482 | D17 | | |
| 18) | 155.9225 | 1.0955 | 25.43 | 1.805180 |
| 19) | 28.9155 | 1.5520 | | |
| 20) | 68.4642 | 1.1868 | 34.96 | 1.801000 |
| 21) | 17.8157 | 5.6603 | 23.78 | 1.846660 |
| 22) | 126.0536 | Bf | | |

[Aspherical Data]

Surface Number N = 2

K = −5.0082
C4 = 6.42810E−05
C6 = −1.62540E−07
C8 = 6.11660E−10
C10 = −9.13480E−13

Surface Number N = 8

K = 1.9410
C4 = −3.17360E−05
C6 = −1.34580E−07
C8 = 1.79850E−10
C10 = −4.47290E−12

[Variable Distances]

| | β = 0 | β = −0.5 | β = −1.0 |
|---|---|---|---|
| D6 | 2.50446 | 6.29642 | 13.4000 |
| D11 | 10.38771 | 6.59575 | 0.10000 |
| D12 | 21.88818 | 11.54539 | 1.64821 |
| D17 | 3.51915 | 13.86323 | 23.75911 |

[Values for Conditional Expressions]

(1): β0 = 1.998
(2): β1 = 0.63

Figure 2A:
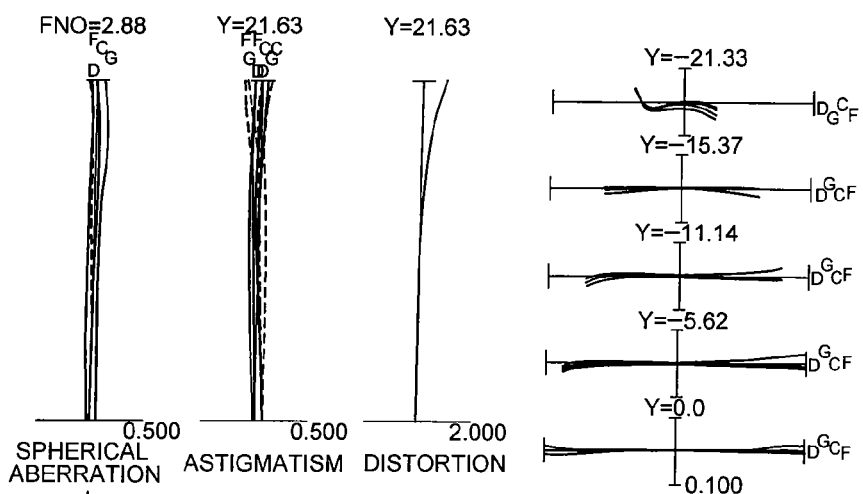
Figure 2B:
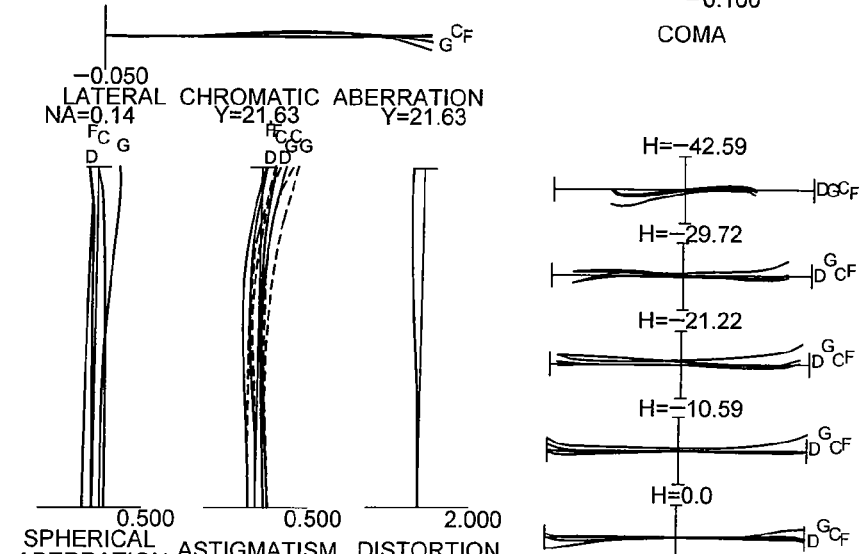
Figure 2C:
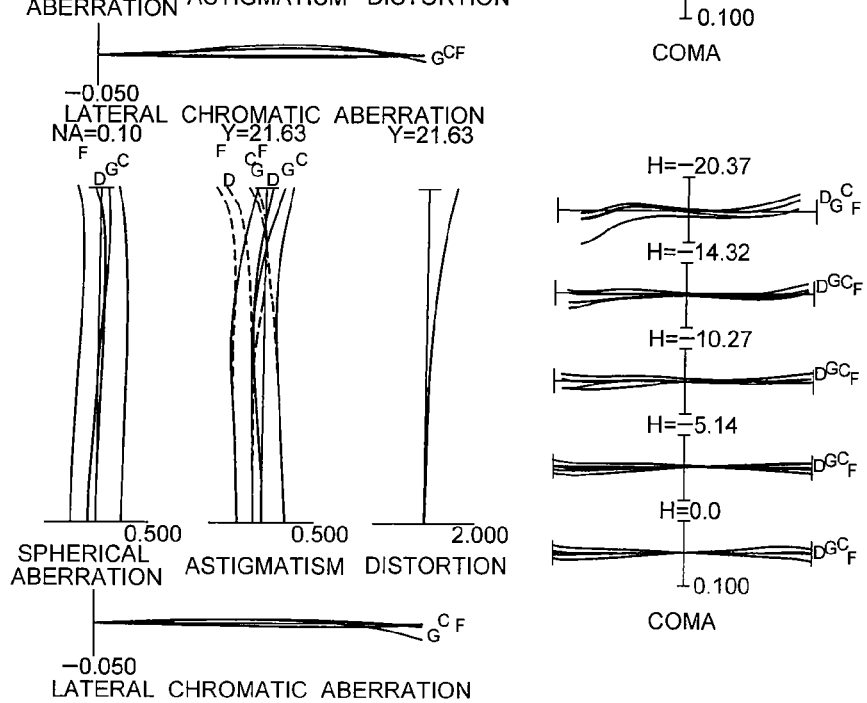

FIGS. 2A, 2B, 2C are graphs showing various aberrations of the close-up lens according to Example 1, in which FIG. 2A is in a state focusing on infinity, FIG. 2B is in a state where an imaging magnification β=−0.5, and FIG. 2C is in a state where an imaging magnification β=−1.0. In this specification throughout D denotes a lateral magnification of the close-up lens in the entirety thereof.

In respective graphs, FNO denotes an f-number, Y denotes an image height, H denotes an object height, D denotes an aberration curve at d-line (wavelength λ=587.6 nm), G denotes an aberration curve at g-line (wavelength λ=435.6 nm), C denotes an aberration curve at C-line (wavelength λ=656.3 nm), and F denotes an aberration curve at F-line (wavelength λ=486.1 nm). The above-described explanation regarding various aberration graphs is the same as the other Examples.

As is apparent from the respective graphs, the close-up lens according to Example 1 shows superb optical performance as a result of good corrections to various aberrations over entire focusing range from infinity β=0 to a close distance allowing a life-size magnification β=−1.0.

EXAMPLE 2

Figure 3:
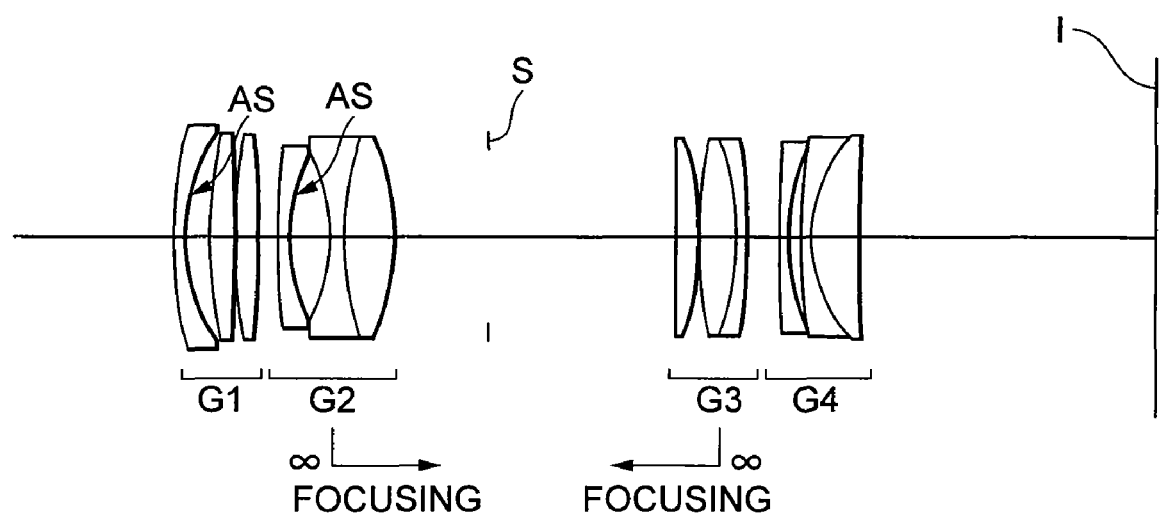
FIG. 3 is a cross-sectional view showing a lens configuration of a close-up lens according to Example 2 upon focusing on infinity.

FIG. 3 is a cross-sectional view showing a lens configuration of a close-up lens according to Example 2 upon focusing on infinity.

As shown in FIG. 3, a close-up lens according to Example 2 is composed of, in order from an object, a first lens group G1 having positive refractive power, a second lens group G2 having negative refractive power, an aperture stop S, a third lens group G3 having positive refractive power, and a fourth lens group G4 having negative refractive power. Upon focusing from infinity to a close distance allowing a life-size magnification, the first lens group G1, the fourth lens group G4, and the aperture stop S are fixed with respect to an image plane I, the second lens group G2 is moved along an optical axis toward the image plane I, and the third lens group G3 is moved along the optical axis toward the object.

The first lens group G1 is composed of, in order from the object, a negative meniscus lens having a convex surface facing the object and an aspherical surface on the image side surface, a positive meniscus lens having a convex surface facing the object, and a double convex positive lens.

The second lens group G2 is composed of, in order from the object, a negative meniscus lens having a convex surface facing the object and an aspherical surface on the image side surface, and a cemented lens constructed by a double concave negative lens cemented with a double convex positive lens.

The third lens group G3 is composed of, in order from the object, a double convex positive lens, and a cemented lens constructed by a double convex positive lens cemented with a negative meniscus lens having a concave surface facing the object.

The fourth lens group G4 is composed of, in order from the object, a negative meniscus lens having a convex surface facing the object, and a cemented lens constructed by a negative meniscus lens having a convex surface facing the object cemented with a positive meniscus lens having a convex surface facing the object.

Various values associated with the close-up lens according to Example 2 are listed in Table 2.

TABLE 2

[Specifications]

| | |
|---|---|
| f = | 58.0 |
| FNO = | 2.88 |
| Bf = | 37.45 |

TABLE 2-continued

[Lens Data]

| N | r | d | vd | nd |
|---|---|---|---|---|
| 1) | 68.8358 | 1.3514 | 39.57 | 1.804400 |
| 2) | 25.1596 | 3.1598 | | |
| 3) | 50.5680 | 3.0890 | 55.48 | 1.638540 |
| 4) | 726.7885 | 0.0997 | | |
| 5) | 61.6542 | 2.8959 | 42.71 | 1.834807 |
| 6) | −213.3350 | D6 | | |
| 7) | 114.0007 | 1.2549 | 64.03 | 1.516120 |
| 8) | 21.4584 | 5.2000 | | |
| 9) | −25.9781 | 1.8341 | 36.30 | 1.620040 |
| 10) | 45.0791 | 6.2262 | 40.77 | 1.883000 |
| 11) | −31.6859 | D11 | | |
| 12> | 0.0000 | D12 | Aperture Stop S | |
| 13) | 279.3330 | 3.0890 | 82.56 | 1.497820 |
| 14) | −45.8650 | 0.0483 | | |
| 15) | 55.7141 | 4.5852 | 65.47 | 1.603000 |
| 16) | −42.3441 | 1.1584 | 23.78 | 1.846660 |
| 17) | −171.5862 | D17 | | |
| 18) | 202.8956 | 1.1584 | 25.43 | 1.805180 |
| 19) | 30.8234 | 1.6410 | | |
| 20) | 90.5377 | 1.2549 | 34.96 | 1.801000 |
| 21) | 18.9814 | 5.9849 | 23.78 | 1.846660 |
| 22) | 242.9593 | Bf | | |

[Aspherical Data]

Surface Number N = 2

K = −5.3148
C4 = 5.58040E−05
C6 = −1.43070E−07
C8 = 5.02630E−10
C10 = −7.75980E−13

Surface Number N = 8

K = 2.1218
C4 = −2.69280E−05
C6 = −9.47080E−08
C8 = 9.70030E−11
C10 = −2.56360E−12

[Variable Distances]

| | β = 0 | β = −0.5 | β = −1.0 |
|---|---|---|---|
| D6 | 2.62569 | 6.63506 | 13.83349 |
| D11 | 12.29619 | 8.28682 | 1.08839 |
| D12 | 23.27238 | 12.33659 | 1.87196 |
| D17 | 4.49094 | 15.42810 | 25.89136 |

[Values for Conditional Expressions]

(1): β0 = 2.00
(2): β1 = 0.64

Figure 4A:
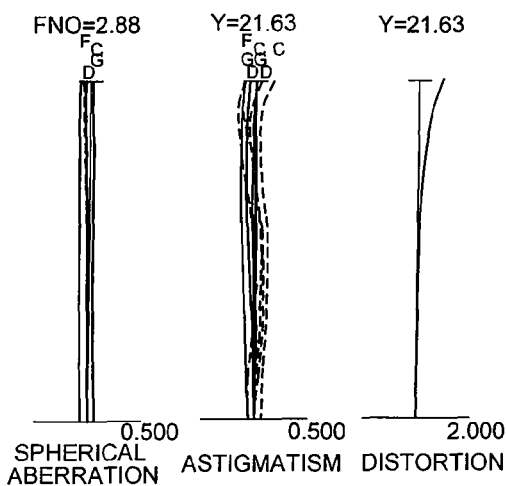
Figure 4A:
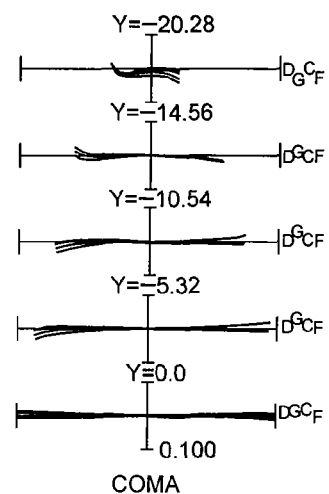
Figure 4B:
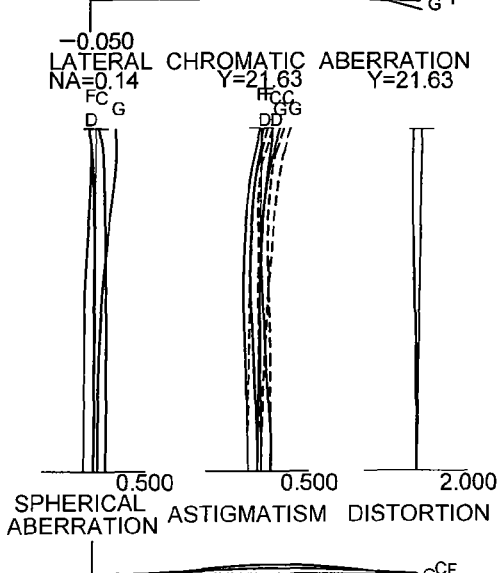
Figure 4B:
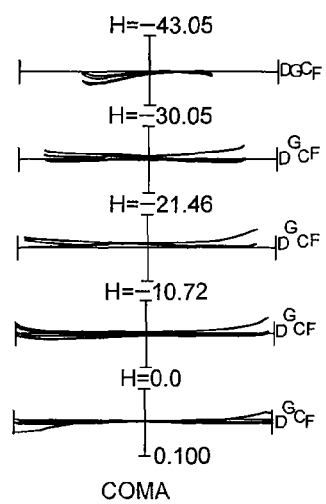
Figure 4C:
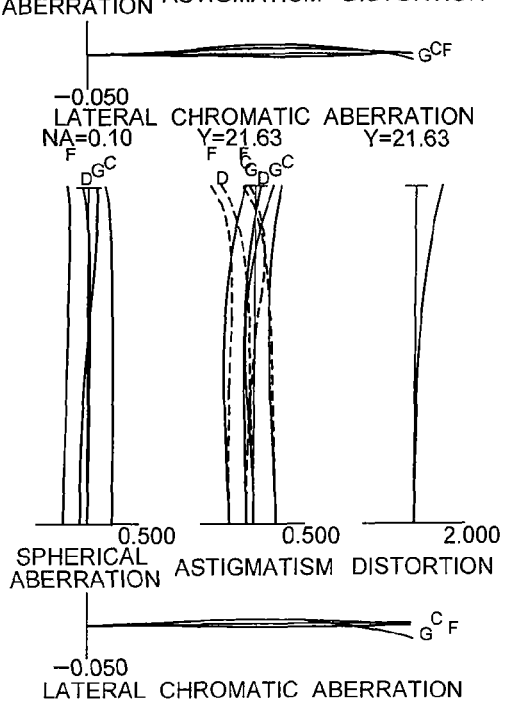
Figure 4C:
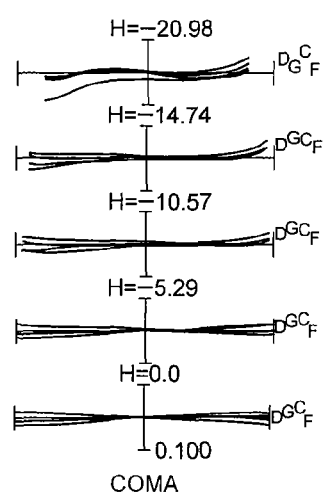

FIGS. 4A, 4B, 4C are graphs showing various aberrations of the close-up lens according to Example 2, in which FIG. 4A is in a state focusing on infinity, FIG. 4B is in a state where an imaging magnification β=−0.5, and FIG. 4C is in a state where an imaging magnification β=−1.0.

As is apparent from the respective graphs, the close-up lens according to Example 2 shows superb optical performance as a result of good corrections to various aberrations over entire focusing range from infinity β=0 to a close distance allowing a life-size magnification μ=−1.0.

EXAMPLE 3

Figure 5:
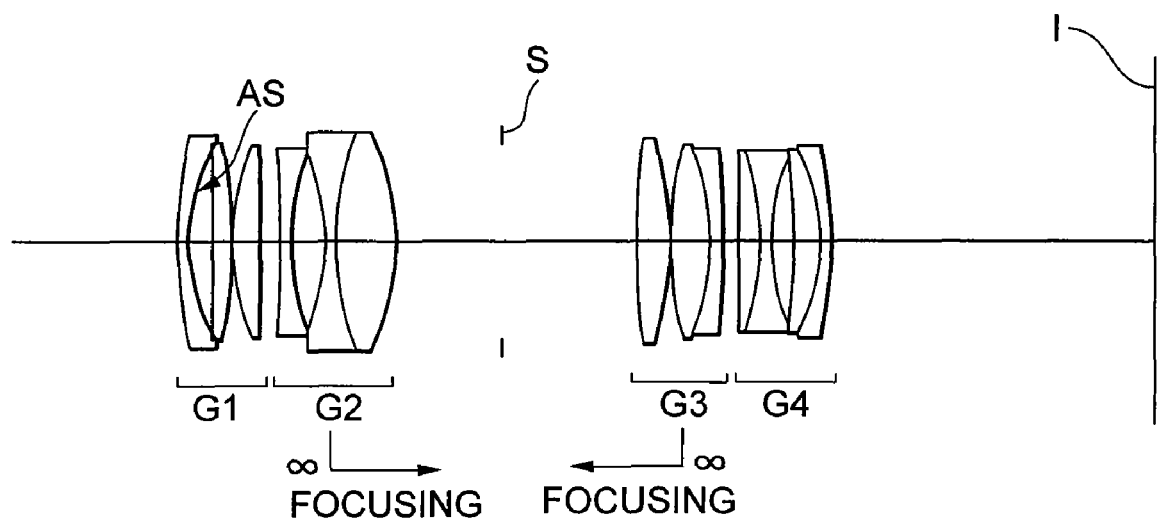
FIG. 5 is a cross-sectional view showing a lens configuration of a close-up lens according to Example 3 upon focusing on infinity.

FIG. 5 is a cross-sectional view showing a lens configuration of a close-up lens according to Example 3 upon focusing on infinity.

As shown in FIG. 5, a close-up lens according to Example 3 is composed of, in order from an object, a first lens group G1 having positive refractive power, a second lens group G2 having negative refractive power, an aperture stop S, a third lens group G3 having positive refractive power, and a fourth lens group G4 having negative refractive power. Upon focusing from infinity to a close distance allowing a life-size magnification, the first lens group G1, the fourth lens group G4, and the aperture stop S are fixed with respect to an image plane I, the second lens group G2 is moved along an optical axis toward the image plane I, and the third lens group G3 is moved along the optical axis toward the object.

The first lens group G1 is composed of, in order from the object, a negative meniscus lens having a convex surface facing the object and an aspherical surface on the image side surface, a double convex positive lens, and a positive meniscus lens having a convex surface facing the object.

The second lens group G2 is composed of, in order from the object, a double concave negative lens, and a cemented lens constructed by a double concave negative lens cemented with a double convex positive lens.

The third lens group G3 is composed of, in order from the object, a double convex positive lens, and a cemented lens constructed by a double convex positive lens cemented with a negative meniscus lens having a concave surface facing the object.

The fourth lens group G4 is composed of, in order from the object, a cemented lens constructed by a positive meniscus lens having a concave surface facing the object cemented with a double concave negative lens, and a cemented lens constructed by a positive meniscus lens having a concave surface facing the object cemented with a negative meniscus lens having a concave surface facing the object.

Various values associated with the close-up lens according to Example 3 are listed in Table 3.

TABLE 3

[Specifications]

| f = | 60.0 |
|---|---|
| FNO = | 2.92 |
| Bf = | 37.96 |

[Lens Data]

| N | r | d | vd | nd |
|---|---|---|---|---|
| 1) | 60.3817 | 1.1000 | 37.17 | 1.834000 |
| 2) | 22.6018 | 3.0297 | | |
| 3) | 3399.2300 | 2.4000 | 52.32 | 1.755000 |
| 4) | −75.0211 | 0.1000 | | |
| 5) | 28.2032 | 3.4000 | 55.53 | 1.696797 |
| 6) | 1042.1457 | D6 | | |
| 7) | −234.0513 | 1.5000 | 40.77 | 1.883000 |
| 8) | 34.3647 | 4.2931 | | |
| 9) | −29.2081 | 1.2000 | 49.82 | 1.617720 |
| 10) | 36.5790 | 7.6000 | 40.77 | 1.883000 |
| 11) | −31.1199 | D11 | | |
| 12> | 0.0000 | D12 | Aperture Stop S | |
| 13) | 91.5369 | 4.0626 | 65.47 | 1.603000 |
| 14) | −45.3779 | 0.1018 | | |
| 15) | 47.5342 | 4.9554 | 65.47 | 1.603000 |
| 16) | −31.3415 | 1.4000 | 23.78 | 1.846660 |
| 17) | −223.9687 | D17 | | |
| 18) | −4996.8991 | 2.7000 | 23.78 | 1.846660 |
| 19) | −37.4608 | 1.4000 | 43.69 | 1.720000 |
| 20) | 28.1629 | 2.7000 | | |
| 21) | −103.6322 | 3.5000 | 39.23 | 1.595510 |
| 22) | −24.1631 | 1.3000 | 40.77 | 1.883000 |
| 23) | −60.5172 | Bf | | |

TABLE 3-continued

[Aspherical Data]

Surface Number N = 2

K = −2.0292
C4 = 3.42730E−05
C6 = −3.44480E−08
C8 = 1.29790E−10
C10 = −1.21790E−13

[Variable Distances]

|  | β = 0 | β = −0.5 | β = −1.0 |
|---|---|---|---|
| D6 | 2.50000 | 6.38544 | 13.10605 |
| D11 | 13.17882 | 9.29338 | 2.57277 |
| D12 | 16.48970 | 10.27593 | 3.94864 |
| D17 | 2.10000 | 8.31377 | 14.64137 |

[Values for Conditional Expressions]

(1): β0 = 3.03
(2): β1 = −0.22

Figure 6A:
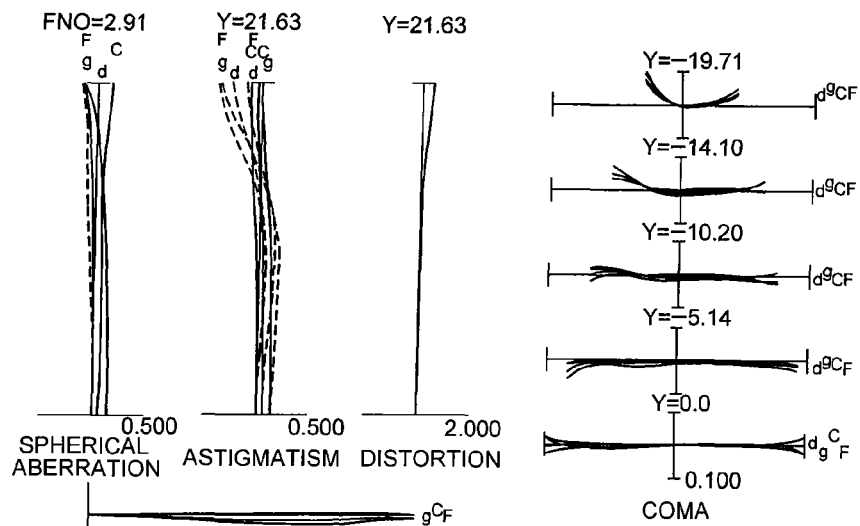
Figure 6B:
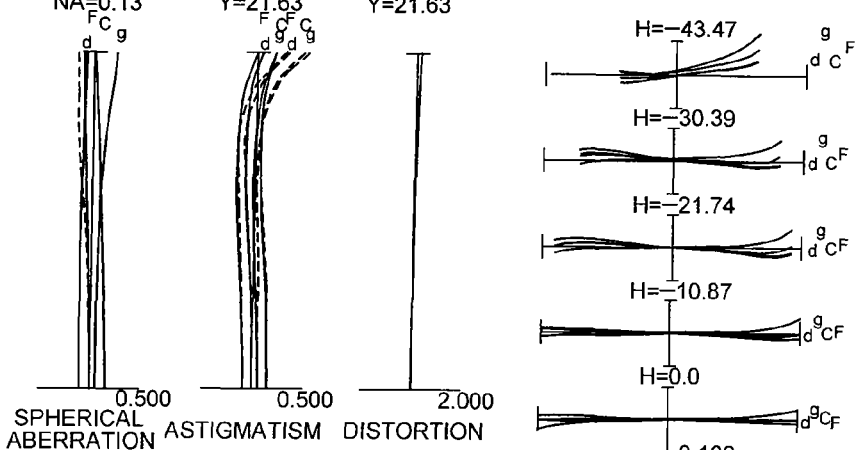
Figure 6C:
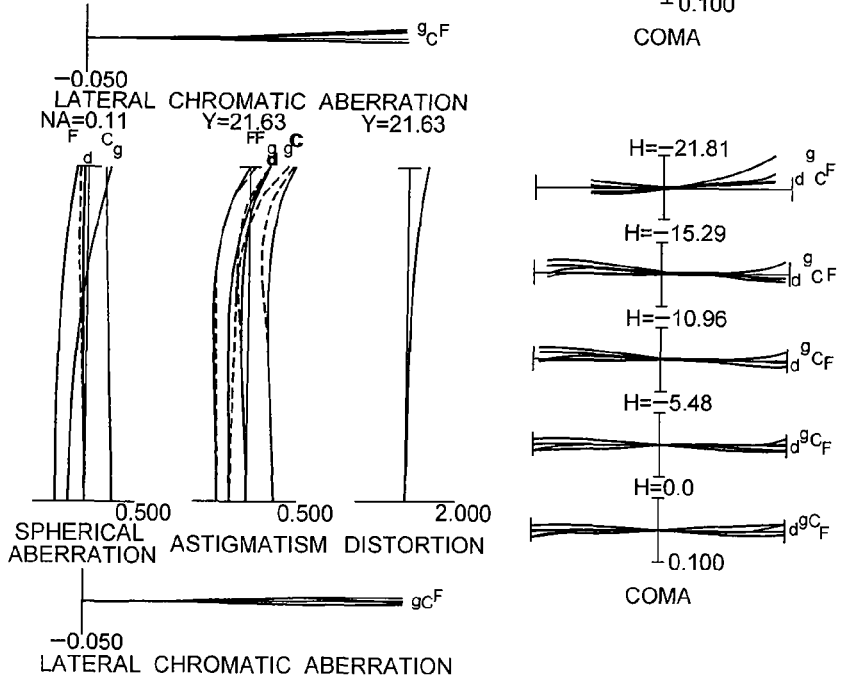

FIGS. 6A, 6B, 6C are graphs showing various aberrations of the close-up lens according to Example 3, in which FIG. 6A is in a state focusing on infinity, FIG. 6B is in a state where an imaging magnification β=−0.5, and FIG. 6C is in a state where an imaging magnification β=−1.0.

As is apparent from the respective graphs, the close-up lens according to Example 3 shows superb optical performance as a result of good corrections to various aberrations over entire focusing range from infinity β=0 to a close distance allowing a life-size magnification β=−1.0.

EXAMPLE 4

Figure 7:
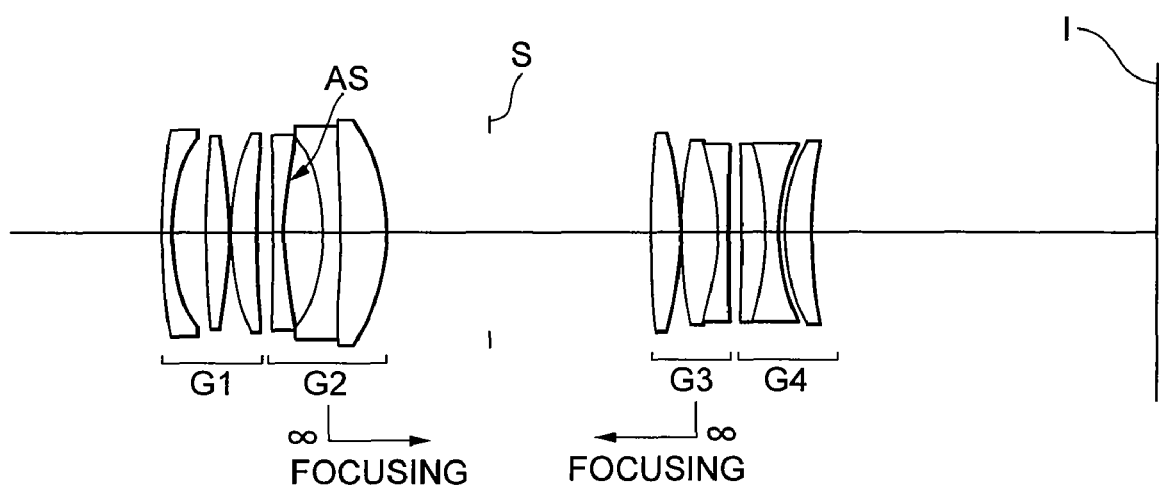
FIG. 7 is a cross-sectional view showing a lens configuration of a close-up lens according to Example 4 upon focusing on infinity.

FIG. 7 is a cross-sectional view showing a lens configuration of a close-up lens according to Example 4 upon focusing on infinity.

As shown in FIG. 7, a close-up lens according to Example 4 is composed of, in order from an object, a first lens group G1 having positive refractive power, a second lens group G2 having negative refractive power, an aperture stop S, a third lens group G3 having positive refractive power, and a fourth lens group G4 having negative refractive power. Upon focusing from infinity to a close distance allowing a life-size magnification, the first lens group G1, the fourth lens group G4, and the aperture stop S are fixed with respect to an image plane I, the second lens group G2 is moved along an optical axis toward the image plane I, and the third lens group G3 is moved along the optical axis toward the object.

The first lens group G1 is composed of, in order from the object, a negative meniscus lens having a convex surface facing the object, a double convex positive lens, and a positive meniscus lens having a convex surface facing the object.

The second lens group G2 is composed of, in order from the object, a double concave negative lens having an aspherical surface on the image side surface, and a cemented lens constructed by a negative meniscus lens having a concave surface facing the object cemented with a positive meniscus lens having a concave surface facing the object.

The third lens group G3 is composed of, in order from the object, a double convex positive lens, and a cemented lens constructed by a double convex positive lens cemented with a double concave negative lens.

The fourth lens group G4 is composed of, in order from the object, a cemented lens constructed by a positive meniscus lens having a concave surface facing the object cemented with a double concave negative lens, and a positive meniscus lens having a convex surface facing the object.

Various values associated with the close-up lens according to Example 4 are listed in Table 4.

TABLE 4

[Specifications]

| f = | 64.9 |
| FNO = | 2.88 |
| Bf = | 37.83 |

[Lens Data]

| N | r | d | vd | nd |
|---|---|---|---|---|
| 1) | 73.1911 | 1.1897 | 35.28 | 1.749497 |
| 2) | 23.7843 | 4.6333 | | |
| 3) | 89.9396 | 3.2000 | 50.74 | 1.677900 |
| 4) | −69.3425 | 0.1081 | | |
| 5) | 32.2463 | 3.4000 | 60.09 | 1.640000 |
| 6) | 119.8334 | D6 | | |
| 7) | −452.8613 | 1.2979 | 44.79 | 1.744000 |
| 8) | 42.2438 | 5.3891 | | |
| 9) | −23.9371 | 2.2712 | 50.88 | 1.658440 |
| 10) | −451.4167 | 6.3000 | 40.77 | 1.883000 |
| 11) | −27.2977 | D11 | | |
| 12> | 0.0000 | D12 | Aperture Stop S | |
| 13) | 113.4847 | 3.8657 | 60.29 | 1.620410 |
| 14) | −50.6983 | 0.1081 | | |
| 15) | 53.8201 | 5.1041 | 65.47 | 1.603000 |
| 16) | −35.6935 | 1.2978 | 26.52 | 1.761820 |
| 17) | 345.1147 | D17 | | |
| 18) | −1814.3448 | 3.2109 | 27.51 | 1.755200 |
| 19) | −42.2202 | 1.7000 | 49.32 | 1.743200 |
| 20) | 25.3684 | 0.8470 | | |
| 21) | 25.6333 | 3.4346 | 56.32 | 1.568830 |
| 22) | 55.0236 | Bf | | |

[Aspherical Data]

Surface Number N = 8

K = −0.0421
C4 = −1.60920E−06
C6 = −5.10530E−09
C8 = 1.78050E−11
C10 = −9.31080E−14

[Variable Distances]

|  | β = 0 | β = −0.5 | β = −1.0 |
|---|---|---|---|
| D6 | 2.34559 | 5.84062 | 11.23623 |
| D11 | 14.06385 | 10.56882 | 5.17320 |
| D12 | 21.92885 | 12.96078 | 4.11221 |
| D17 | 1.88582 | 10.85389 | 19.70246 |

[Values for Conditional Expressions]

(1): β0 = 3.20
(2): β1 = −0.17

Figure 8A:
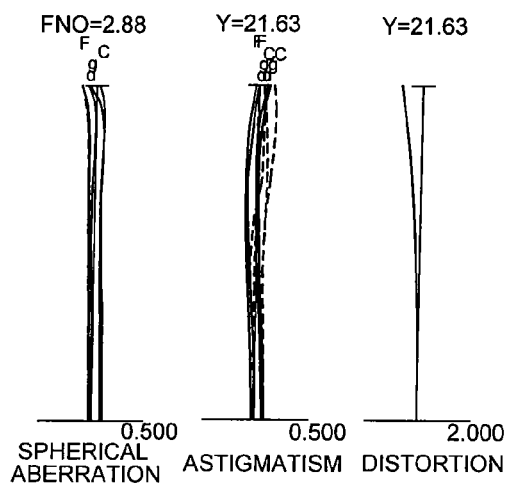
Figure 8A:
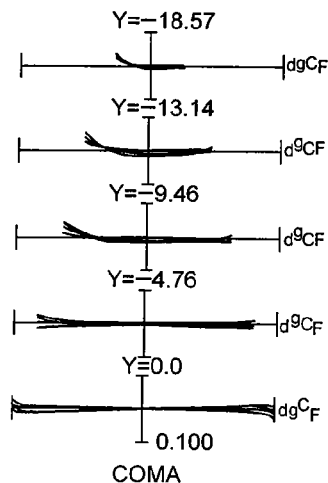
Figure 8B:
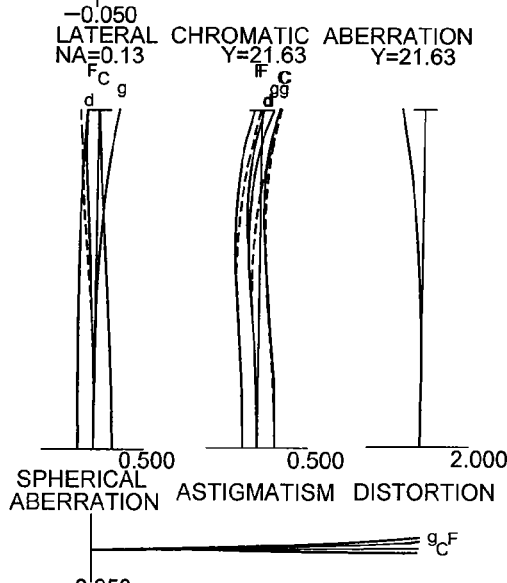
Figure 8B:
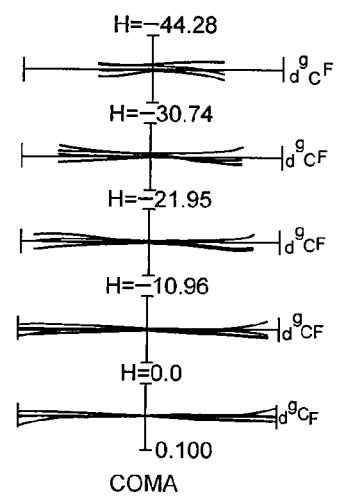
Figure 8C:
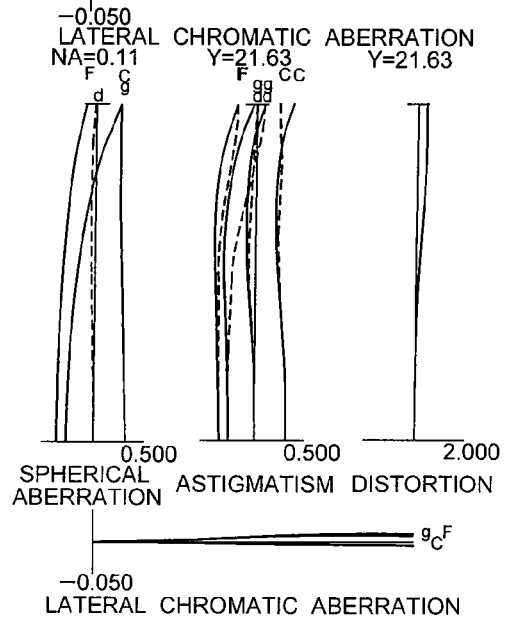
Figure 8C:
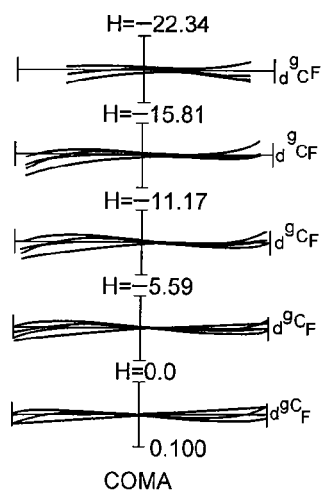

FIGS. 8A, 8B, 8C are graphs showing various aberrations of the close-up lens according to Example 4, in which FIG. 8A is in a state focusing on infinity, FIG. 8B is in a state where an imaging magnification β=−0.5, and FIG. 8C is in a state where an imaging magnification β=−1.0.

As is apparent from the respective graphs, the close-up lens according to Example 4 shows superb optical performance as a result of good corrections to various aberrations over entire focusing range from infinity β=0 to a close distance allowing a life-size magnification β=−1.0.

EXAMPLE 5

Figure 9:
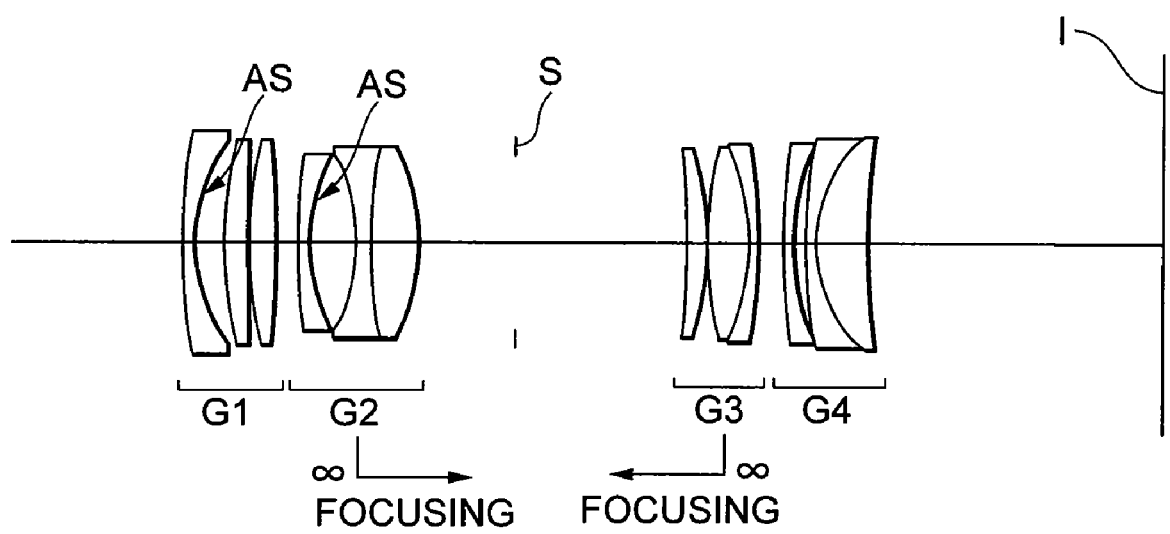
FIG. 9 is a cross-sectional view showing a lens configuration of a close-up lens according to Example 5 upon focusing on infinity.

FIG. 9 is a cross-sectional view showing a lens configuration of a close-up lens according to Example 5 upon focusing on infinity.

As shown in FIG. 9, a close-up lens according to Example 5 is composed of, in order from an object, a first lens group G1 having positive refractive power, a second lens group G2 having negative refractive power, an aperture stop S, a third lens group G3 having positive refractive power, and a fourth lens group G4 having negative refractive power. Upon focusing from infinity to a close distance allowing a life-size magnification, the first lens group G1, the fourth lens group G4, and the aperture stop S are fixed with respect to an image plane I, the second lens group G2 is moved along an optical axis toward the image plane I, and the third lens group G3 is moved along the optical axis toward the object.

The first lens group G1 is composed of, in order from the object, a negative meniscus lens having a convex surface facing the object, a positive meniscus lens having a convex surface facing the object, and a double convex positive lens. The most object side negative meniscus lens is an aspherical lens forming an aspherical surface on the image plane I side glass surface by applying a resin layer.

The second lens group G2 is composed of, in order from the object, a negative meniscus lens having a convex surface facing the object and an aspherical surface on the image side surface, and a cemented lens constructed by a double concave negative lens cemented with a double convex positive lens.

The third lens group G3 is composed of, in order from the object, a positive meniscus lens having a concave surface facing the object, and a cemented lens constructed by a double convex positive lens cemented with a negative meniscus lens having a concave surface facing the object.

The fourth lens group G4 is composed of, in order from the object, a negative meniscus lens having a convex surface facing the object, and a cemented lens constructed by a negative meniscus lens having a convex surface facing the object cemented with a positive meniscus lens having a convex surface facing the object.

Various values associated with the close-up lens according to Example 5 are listed in Table 5.

TABLE 5

[Specifications]

| | |
|---|---|
| f = | 50.75 |
| FNO = | 2.80 |
| Bf = | 35.00 |

[Lens Data]

| N | r | d | vd | nd |
|---|---|---|---|---|
| 1) | 72.3338 | 1.2394 | 42.72 | 1.834810 |
| 2) | 20.5000 | 0.2000 | 38.09 | 1.553890 |
| 3) | 21.7574 | 3.6262 | | |
| 4) | 49.4081 | 2.8000 | 54.68 | 1.729157 |
| 5) | 322.3365 | 0.0443 | | |
| 6) | 43.9944 | 3.2000 | 46.63 | 1.816000 |
| 7) | −215.5926 | D7 | | |
| 8) | 89.5564 | 1.2394 | 64.03 | 1.516120 |
| 9) | 21.0795 | 5.6430 | | |
| 10) | −24.8795 | 1.6821 | 36.30 | 1.620040 |
| 11) | 53.7747 | 5.7101 | 40.77 | 1.883000 |
| 12) | −29.6576 | D12 | | |
| 13> | 0.0000 | D13 | Aperture Stop S | |
| 14) | −164.6300 | 2.5000 | 82.56 | 1.497820 |
| 15) | −43.8195 | 0.0443 | | |
| 16) | 48.5362 | 5.0000 | 63.38 | 1.618000 |
| 17) | −31.5106 | 1.0624 | 23.78 | 1.846660 |
| 18) | −87.1486 | D18 | | |
| 19) | 87.4674 | 1.1509 | 25.43 | 1.805180 |
| 20) | 27.5622 | 1.5139 | | |
| 21) | 56.1194 | 1.2837 | 34.96 | 1.801000 |
| 22) | 17.5250 | 6.0000 | 23.78 | 1.846660 |
| 23) | 76.8622 | Bf | | |

[Aspherical Data]

Surface Number N = 3

K = 1.5218
C4 = −4.94910E−07
C6 = −1.58790E−08
C8 = −6.47580E−11
C10 = −3.02540E−13

Surface Number N = 9

K = −2.3833
C4 = 3.22620E−05
C6 = −1.31840E−07
C8 = 5.38320E−10
C10 = −1.90480E−12

[Variable Distances]

| | β = 0 | β = −0.5 | β = −1.0 |
|---|---|---|---|
| D7 | 2.73230 | 6.40936 | 13.01116 |
| D12 | 11.62011 | 7.94305 | 1.34125 |
| D13 | 20.51008 | 10.48069 | 0.88340 |
| D18 | 2.96672 | 12.99737 | 22.59339 |

[Values for Conditional Expressions]

(1): β0 = 1.79
(2): β1 = 0.74

Figure 10A:
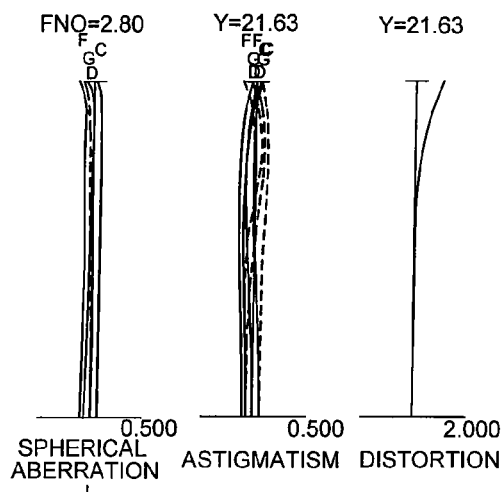
Figure 10A:
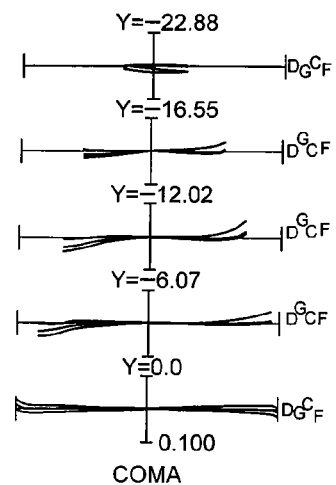
Figure 10B:
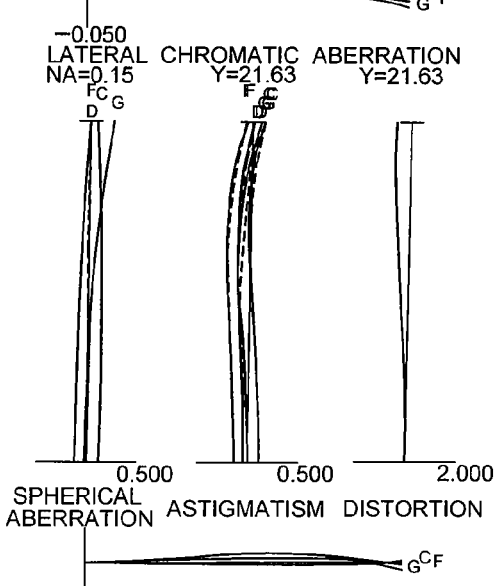
Figure 10B:
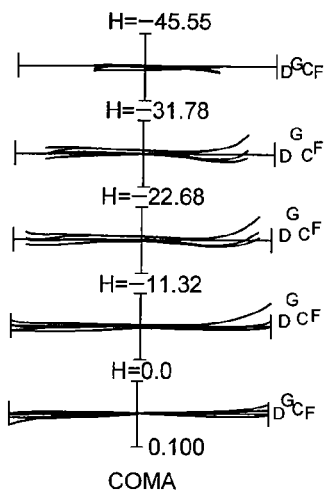
Figure 10C:
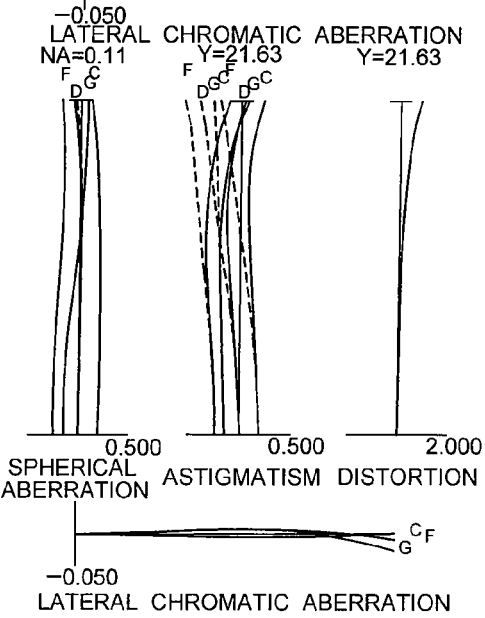
Figure 10C:
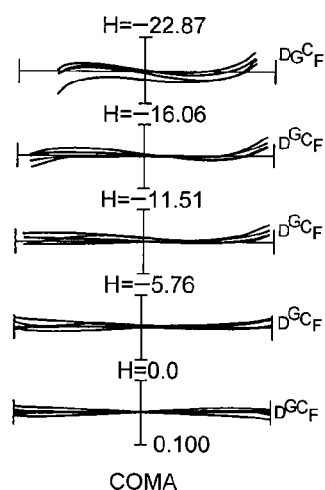

FIGS. 10A, 10B, 10C are graphs showing various aberrations of the close-up lens according to Example 5, in which FIG. 10A is in a state focusing on infinity, FIG. 10B is in a state where an imaging magnification β=−0.5, and FIG. 10C is in a state where an imaging magnification β=−1.0.

As is apparent from the respective graphs, the close-up lens according to Example 5 shows superb optical performance as a result of good corrections to various aberrations over entire focusing range from infinity β=0 to a close distance allowing a life-size magnification β=−1.0.

EXAMPLE 6

Figure 11:
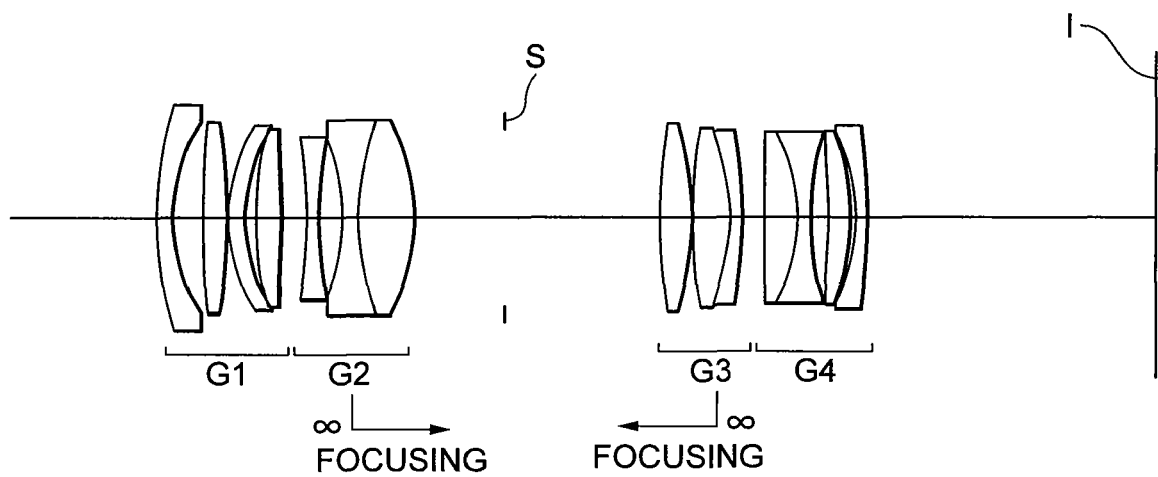
FIG. 11 is a cross-sectional view showing a lens configuration of a close-up lens according to Example 6 upon focusing on infinity.

FIG. 11 is a cross-sectional view showing a lens configuration of a close-up lens according to Example 6 upon focusing on infinity.

As shown in FIG. 11, a close-up lens according to Example 6 is composed of, in order from an object, a first lens group G1 having positive refractive power, a second lens group G2 having negative refractive power, an aperture stop S, a third lens group G3 having positive refractive power, and a fourth lens group G4 having negative refractive power. Upon focusing from infinity to a close distance allowing a life-size magnification, the first lens group G1, the fourth lens group G4, and the aperture stop S are fixed with respect to an image plane I, the second lens group G2 is moved along an optical axis toward the image plane I, and the third lens group G3 is moved along the optical axis toward the object.

The first lens group G1 is composed of, in order from the object, a negative meniscus lens having a convex surface facing the object, a double convex positive lens, a negative meniscus lens having a convex surface facing the object, and a double convex positive lens.

The second lens group G2 is composed of, in order from the object, a double concave negative lens, and a cemented lens constructed by a double concave negative lens cemented with a double convex positive lens.

The third lens group G3 is composed of, in order from the object, a double convex positive lens, and a cemented lens constructed by a double convex positive lens cemented with a negative meniscus lens having a concave surface facing the object.

The fourth lens group G4 is composed of, in order from the object, a cemented lens constructed by a double convex positive lens cemented with a double concave negative lens, a positive meniscus lens having a concave surface facing the object, and a negative meniscus lens having a concave surface facing the object.

Various values associated with the close-up lens according to Example 6 are listed in Table 6.

TABLE 6

[Specifications]

| | |
|---|---|
| f = | 59.99 |
| FNO = | 2.88 |
| Bf = | 35.07 |

[Lens Data]

| N | r | d | vd | nd |
|---|---|---|---|---|
| 1) | 49.6392 | 2.0000 | 40.77 | 1.883000 |
| 2) | 24.1735 | 4.5000 | | |
| 3) | 107.0994 | 3.2000 | 42.72 | 1.834810 |
| 4) | −118.9379 | 0.1000 | | |
| 5) | 23.9586 | 2.2000 | 70.24 | 1.487490 |
| 6) | 22.1799 | 1.7000 | | |
| 7) | 43.4010 | 3.5000 | 60.69 | 1.563840 |
| 8) | −804.1163 | D8 | | |
| 9) | −81.7637 | 1.6000 | 40.77 | 1.883000 |
| 10) | 49.2732 | 3.4322 | | |
| 11) | −35.4331 | 2.1000 | 43.69 | 1.720000 |
| 12) | 32.3118 | 8.0000 | 40.77 | 1.883000 |
| 13) | −30.3900 | D13 | | |
| 14> | 0.0000 | D14 | Aperture Stop S | |
| 15) | 69.6837 | 4.5000 | 81.61 | 1.497000 |
| 16) | −45.6572 | 0.1000 | | |
| 17) | 63.7316 | 5.3000 | 70.24 | 1.487490 |
| 18) | −33.6688 | 1.6000 | 23.78 | 1.846660 |
| 19) | −91.3448 | D19 | | |
| 20) | 661.9601 | 4.5000 | 23.78 | 1.846660 |
| 21) | −27.3275 | 1.8000 | 27.51 | 1.755200 |
| 22) | 36.2356 | 2.6000 | | |
| 23) | −215.2877 | 2.8000 | 23.78 | 1.846660 |
| 24) | −38.5091 | 0.9000 | | |
| 25) | −28.6608 | 1.5000 | 52.32 | 1.755000 |
| 26) | −121.5032 | Bf | | |

[Variable Distances]

| | β = 0 | β = −0.5 | β = −1.0 |
|---|---|---|---|
| D8 | 3.53723 | 7.45531 | 13.98947 |
| D13 | 12.82448 | 8.90640 | 2.37224 |
| D14 | 21.64645 | 12.66373 | 3.44637 |
| D19 | 3.17811 | 12.16083 | 21.37819 |

[Values for Conditional Expressions]

(1): β0 = 3.93
(2): β1 = −0.34

Figure 12A:
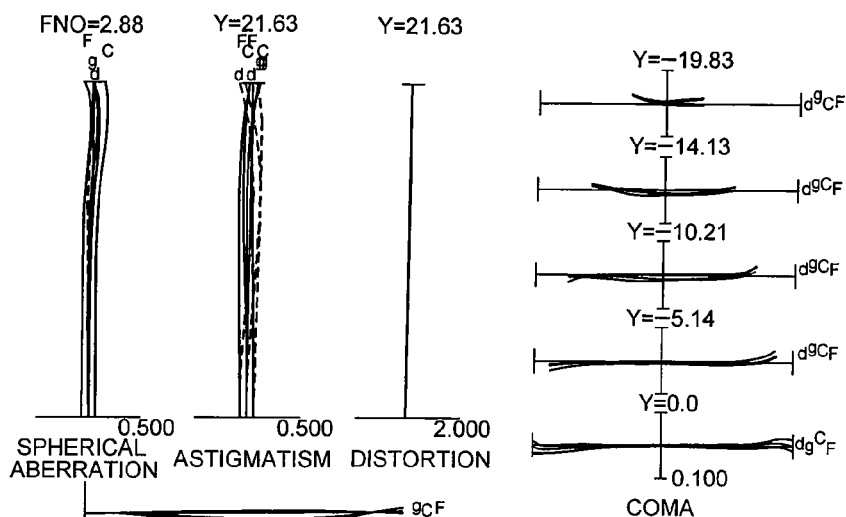
Figure 12B:
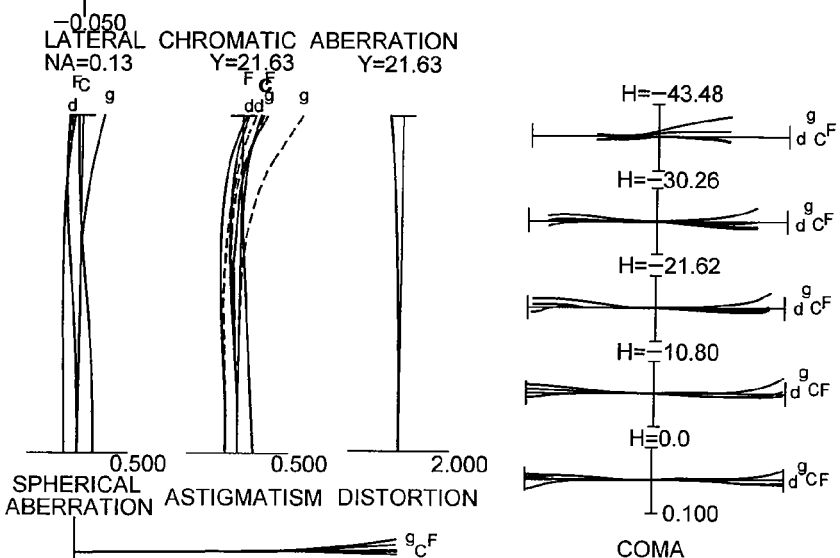
Figure 12C:
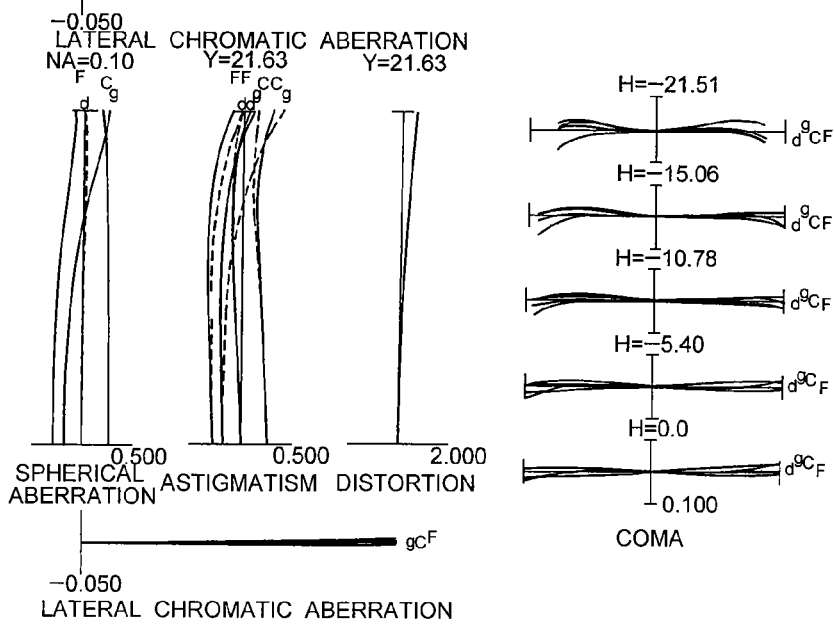

FIGS. 12A, 12B, 12C are graphs showing various aberrations of the close-up lens according to Example 6, in which FIG. 12A is in a state focusing on infinity, FIG. 12B is in a state where an imaging magnification β=−0.5, and FIG. 12C is in a state where an imaging magnification β=−1.0.

As is apparent from the respective graphs, the close-up lens according to Example 6 shows superb optical performance as a result of good corrections to various aberrations over entire focusing range from infinity β=0 to a close distance allowing a life-size magnification β=−1.0.

EXAMPLE 7

Figure 13:
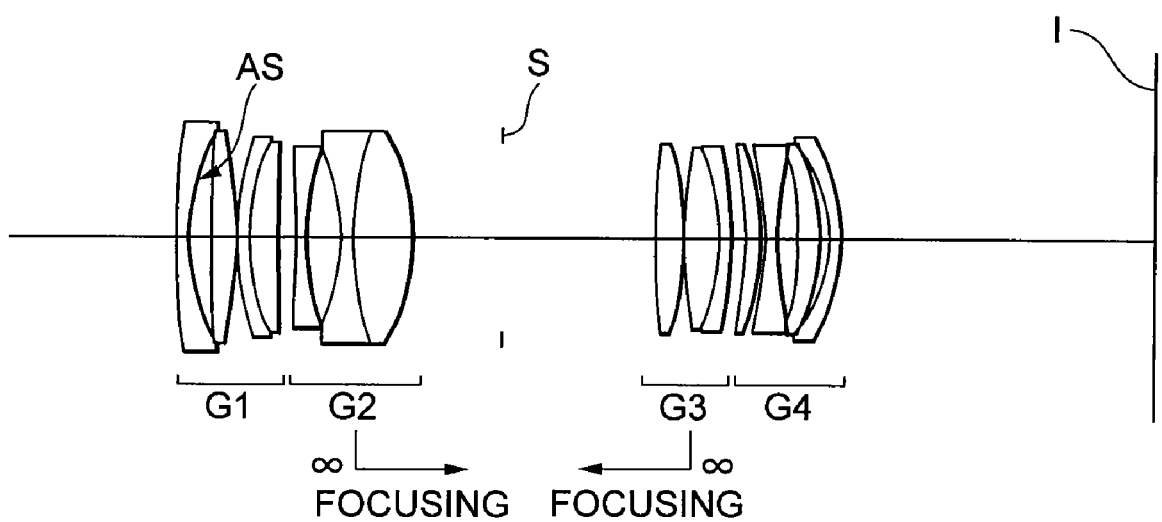
FIG. 13 is a cross-sectional view showing a lens configuration of a close-up lens according to Example 7 upon focusing on infinity.

FIG. 13 is a cross-sectional view showing a lens configuration of a close-up lens according to Example 7 upon focusing on infinity.

As shown in FIG. 13, a close-up lens according to Example 7 is composed of, in order from an object, a first lens group G1 having positive refractive power, a second lens group G2 having negative refractive power, an aperture stop S, a third lens group G3 having positive refractive power, and a fourth lens group G4 having negative refractive power. Upon focusing from infinity to a close distance allowing a life-size magnification, the first lens group G1, the fourth lens group G4, and the aperture stop S are fixed with respect to an image plane I, the second lens group G2 is moved along an optical axis toward the image plane I, and the third lens group G3 is moved along the optical axis toward the object.

The first lens group G1 is composed of, in order from the object, a negative meniscus lens having a convex surface facing the object and an aspherical surface on the image side surface, a double convex positive lens, and a cemented lens constructed by a negative meniscus lens having a convex surface facing the object cemented with a positive meniscus lens having a convex surface facing the object.

The second lens group G2 is composed of, in order from the object, a double concave negative lens, and a cemented lens constructed by a double concave negative lens cemented with a double convex positive lens.

The third lens group G3 is composed of, in order from the object, a double convex positive lens, and a cemented lens constructed by a double convex positive lens cemented with a negative meniscus lens having a concave surface facing the object.

The fourth lens group G4 is composed of, in order from the object, a positive meniscus lens having a concave surface facing the object, a double concave negative lens, a positive meniscus lens having a concave surface facing the object, and a negative meniscus lens having a concave surface facing the object.

Various values associated with the close-up lens according to Example 7 are listed in Table 7.

TABLE 7

[Specifications]

| | |
|---|---|
| f = | 57.6 |
| FNO = | 2.88 |
| Bf = | 36.95 |

[Lens Data]

| N | r | d | vd | nd |
|---|---|---|---|---|
| 1) | 99.7242 | 1.3446 | 37.17 | 1.834000 |
| 2) | 25.2586 | 2.9500 | | |
| 3) | 162.4990 | 3.2654 | 52.32 | 1.755000 |
| 4) | −63.3696 | 0.0960 | | |
| 5) | 37.5818 | 1.5366 | 23.78 | 1.846660 |
| 6) | 27.4223 | 3.4574 | 40.77 | 1.883000 |
| 7) | 269.9034 | D7 | | |
| 8) | −204.9659 | 1.1525 | 46.58 | 1.804000 |
| 9) | 31.9916 | 4.4699 | | |
| 10) | −26.4063 | 1.2965 | 44.89 | 1.639300 |

TABLE 7-continued

| | | | | |
|---|---|---|---|---|
| 11) | 38.5096 | 7.4431 | 40.77 | 1.883000 |
| 12) | −28.3376 | D12 | | |
| 13> | 0.0000 | D13 | Aperture Stop S | |
| 14) | 88.2222 | 3.4574 | 94.97 | 1.438750 |
| 15) | −40.8526 | 0.0978 | | |
| 16) | 54.7952 | 4.5139 | 81.61 | 1.497000 |
| 17) | −29.6922 | 1.2485 | 23.78 | 1.846660 |
| 18) | −63.2238 | D18 | | |
| 19) | −59.1213 | 1.9208 | 23.78 | 1.846660 |
| 20) | −32.4933 | 0.5282 | | |
| 21) | −45.9203 | 1.3446 | 41.24 | 1.701540 |
| 22) | 41.5215 | 2.4970 | | |
| 23) | −56.7820 | 2.8812 | 34.47 | 1.639800 |
| 24) | −28.5627 | 1.2485 | | |
| 25) | −18.5941 | 1.3446 | 60.09 | 1.640000 |
| 26) | −26.8640 | Bf | | |

[Aspherical Data]

Surface Number N = 2

K = 0.5089
C4 = 4.78110E−06
C6 = 1.77850E−09
C8 = 3.09600E−11
C10 = −7.17800E−15

[Variable Distances]

| | β = 0 | β = −0.5 | β = −1.0 |
|---|---|---|---|
| D7 | 2.26762 | 5.23755 | 10.56946 |
| D12 | 11.02008 | 8.05013 | 3.19843 |
| D13 | 19.08376 | 11.23975 | 3.59710 |
| D18 | 1.91404 | 9.75805 | 17.40070 |

[Values for Conditional Expressions]

(1): β0 = 2.59
(2): β1 = −0.20

Figure 14A:
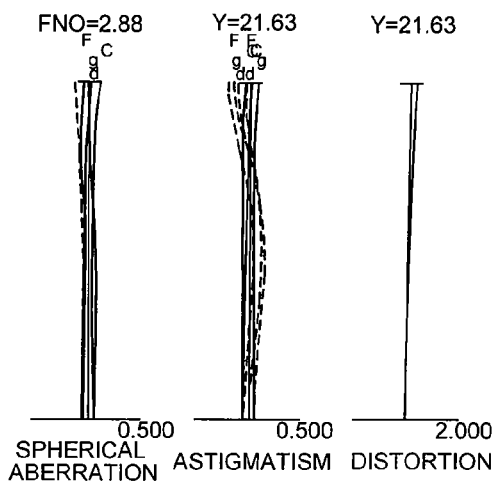
Figure 14A:
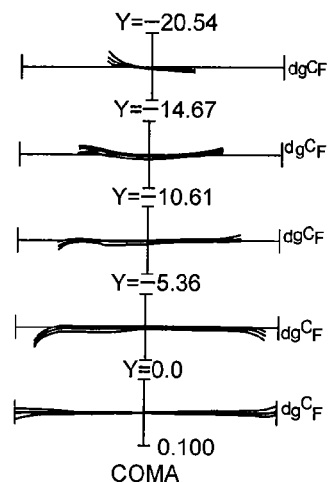
Figure 14B:
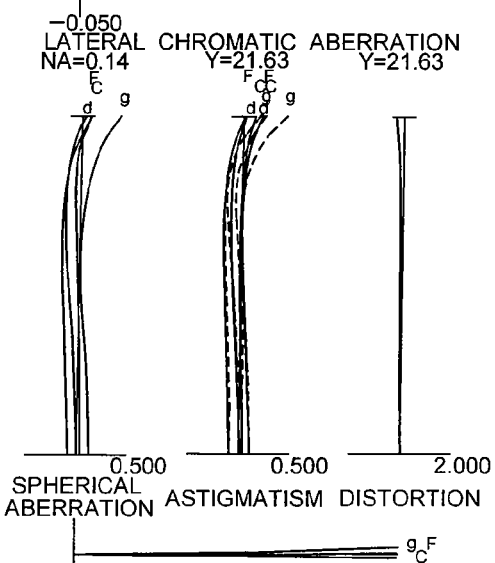
Figure 14B:
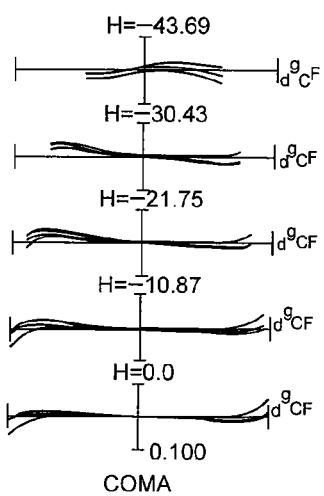
Figure 14C:
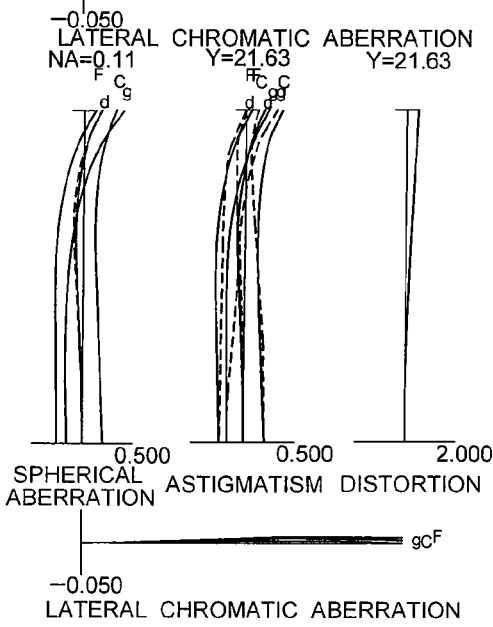
Figure 14C:
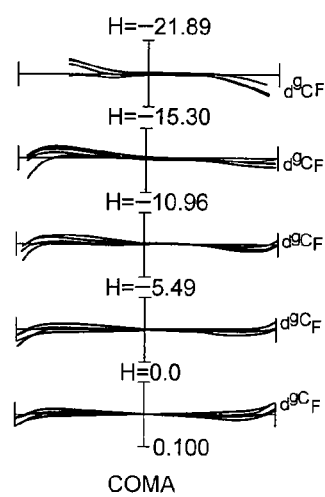

FIGS. 14A, 14B, 14C are graphs showing various aberrations of the close-up lens according to Example 7, in which FIG. 14A is in a state focusing on infinity, FIG. 14B is in a state where an imaging magnification β=−0.5, and FIG. 14C is in a state where an imaging magnification β=−1.0.

As is apparent from the respective graphs, the close-up lens according to Example 7 shows superb optical performance as a result of good corrections to various aberrations over entire focusing range from infinity β=0 to a close distance allowing a life-size magnification β=−1.0.

EXAMPLE 8

Figure 15:
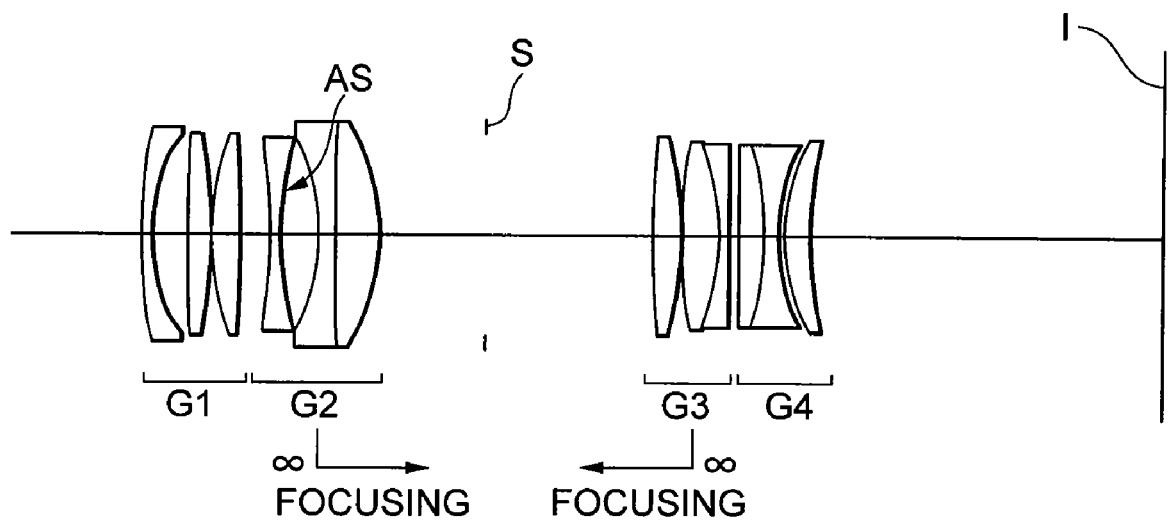
FIG. 15 is a cross-sectional view showing a lens configuration of a close-up lens according to Example 8 upon focusing on infinity.

FIG. 15 is a cross-sectional view showing a lens configuration of a close-up lens according to Example 8 upon focusing on infinity.

As shown in FIG. 15, a close-up lens according to Example 8 is composed of, in order from an object, a first lens group G1 having positive refractive power, a second lens group G2 having negative refractive power, an aperture stop S, a third lens group G3 having positive refractive power, and a fourth lens group G4 having negative refractive power. Upon focusing from infinity to a close distance allowing a life-size magnification, the first lens group G1, the fourth lens group G4, and the aperture stop S are fixed with respect to an image plane I, the second lens group G2 is moved along an optical axis toward the image plane I, and the third lens group G3 is moved along the optical axis toward the object.

The first lens group G1 is composed of, in order from the object, a negative meniscus lens having a convex surface facing the object, a double convex positive lens, and a double convex positive lens.

The second lens group G2 is composed of, in order from the object, a double concave negative lens having an aspherical surface on the image side surface, and a cemented lens constructed by a double concave negative lens cemented with a double convex positive lens.

The third lens group G3 is composed of, in order from the object, a double convex positive lens, and a cemented lens constructed by a double convex positive lens cemented with a double concave negative lens.

The fourth lens group G4 is composed of, in order from the object, a cemented lens constructed by a double convex positive lens cemented with a double concave negative lens, and a positive meniscus lens having a convex surface facing the object.

Various values associated with the close-up lens according to Example 8 are listed in Table 8.

TABLE 8

[Specifications]

f = 60.0
FNO = 2.89
Bf = 43.16

[Lens Data]

| N | r | d | vd | nd |
|---|---|---|---|---|
| 1) | 61.8055 | 1.1000 | 35.28 | 1.749497 |
| 2) | 21.7357 | 4.5000 | | |
| 3) | 178.0125 | 2.8000 | 50.74 | 1.677900 |
| 4) | −81.1807 | 0.1000 | | |
| 5) | 31.8030 | 3.4000 | 60.09 | 1.640000 |
| 6) | −430.0858 | D6 | | |
| 7) | −93.9735 | 1.2001 | 44.79 | 1.744000 |
| 8) | 43.2422 | 4.7000 | | |
| 9) | −26.6717 | 2.1000 | 50.88 | 1.658440 |
| 10) | 225.7682 | 5.4000 | 40.77 | 1.883000 |
| 11) | −26.6715 | D11 | | |
| 12> | 0.0000 | D12 | Aperture Stop S | |
| 13) | 76.1926 | 3.5744 | 60.29 | 1.620410 |
| 14) | −51.5727 | 0.1000 | | |
| 15) | 57.2625 | 4.7195 | 65.47 | 1.603000 |
| 16) | −31.6111 | 1.2000 | 26.52 | 1.761820 |
| 17) | 518.3373 | D17 | | |
| 18) | 1121.7328 | 2.9689 | 27.51 | 1.755200 |
| 19) | −43.1177 | 1.8000 | 49.32 | 1.743200 |
| 20) | 23.2742 | 0.7437 | | |
| 21) | 23.6785 | 3.1758 | 56.32 | 1.568830 |
| 22) | 47.1230 | Bf | | |

[Aspherical Data]

Surface Number N = 8

K = 0.1631
C4 = −2.60650E−06
C6 = −2.93000E−09
C8 = −1.25040E−11
C10 = −3.46030E−14

[Variable Distances]

| | β = 0 | β = −0.5 | β = −1.0 |
|---|---|---|---|
| D6 | 3.86985 | 7.10150 | 12.09051 |
| D11 | 13.24131 | 10.00966 | 5.02065 |
| D12 | 20.36812 | 12.07586 | 3.89411 |
| D17 | 1.18069 | 9.47295 | 17.65470 |

[Values for Conditional Expressions]

(1): β0 = 3.20
(2): β1 = −0.23

Figure 16A:
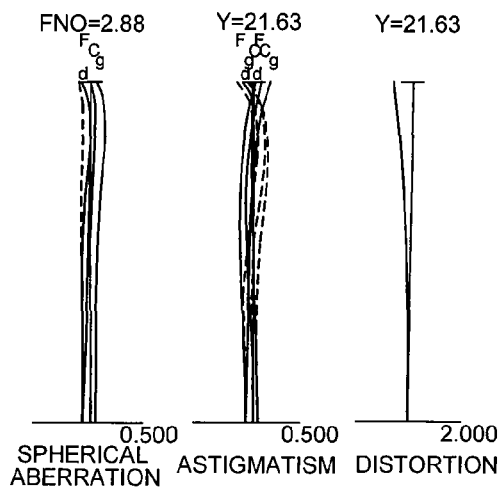
Figure 16A:
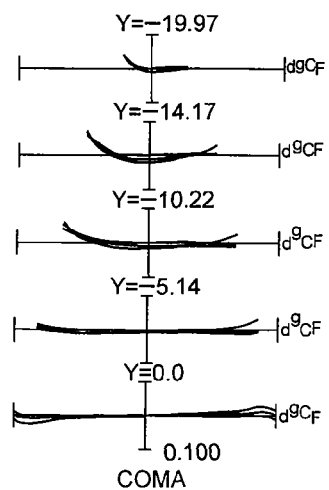
Figure 16B:
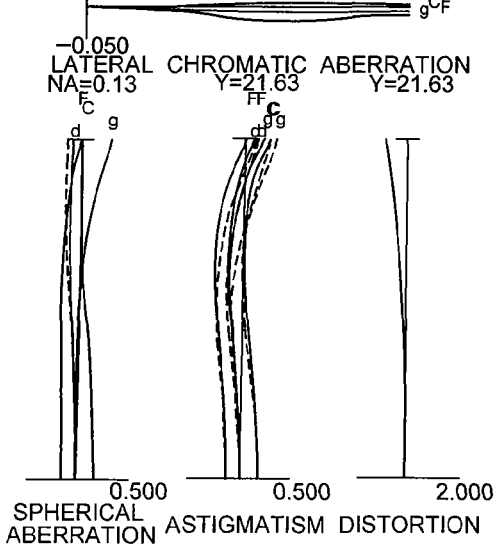
Figure 16B:
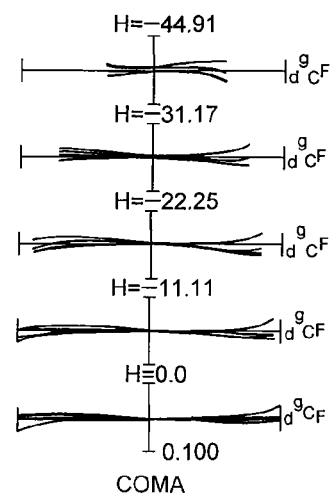
Figure 16C:
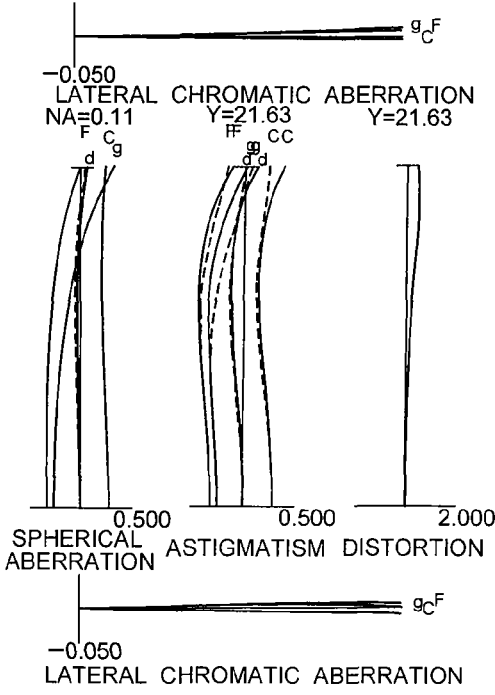
Figure 16C:
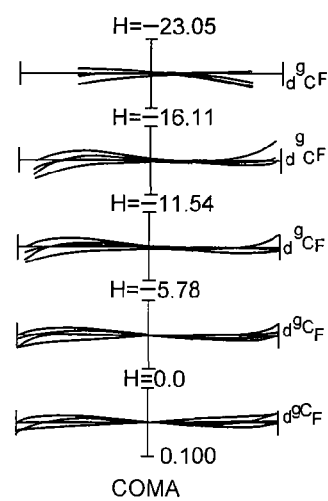

FIGS. 16A, 16B, 16C are graphs showing various aberrations of the close-up lens according to Example 8, in which FIG. 16A is in a state focusing on infinity, FIG. 16B is in a state where an imaging magnification β=−0.5, and FIG. 16C is in a state where an imaging magnification β=−1.0.

As is apparent from the respective graphs, the close-up lens according to Example 8 shows superb optical performance as a result of good corrections to various aberrations over entire focusing range from infinity β=0 to a close distance allowing a life-size magnification β=−1.0.

As described above, the present embodiment makes it possible to provide a close-up lens with superb optical performance capable of focusing from infinity to a close distance allowing a life-size magnification by an internal focusing system with small moving amounts of focusing lens groups, an imaging apparatus, and a method for focusing a close-up lens.

Although a close-up lens with a four-lens-group configuration is shown as each Example of the present embodiment, the lens-group configuration according to the present embodiment is not limited to this, other lens-group configurations such as a five-lens-group configuration are possible.

In a close-up lens according to present embodiment, in order to correct an image blur caused by a camera shake, a portion of a lens group, or a single lens group may be moved as a vibration reduction lens group in a direction perpendicular to the optical axis. In a close-up lens according to present embodiment, it is preferable that the fourth lens group or a portion thereof is used for the vibration reduction lens group.

Moreover, any lens surface may be formed as an aspherical surface. The aspherical surface may be fabricated by a fine grinding process, a glass molding process that a glass material is formed into an aspherical shape by a mold, or a compound type process that a resin material is formed into an aspherical shape on a glass lens surface.

An antireflection coating having high transmittance over a broad wavelength range may be applied to each lens surface to reduce flare or ghost images, so that high optical performance with a high contrast can be attained.

Figure 17:
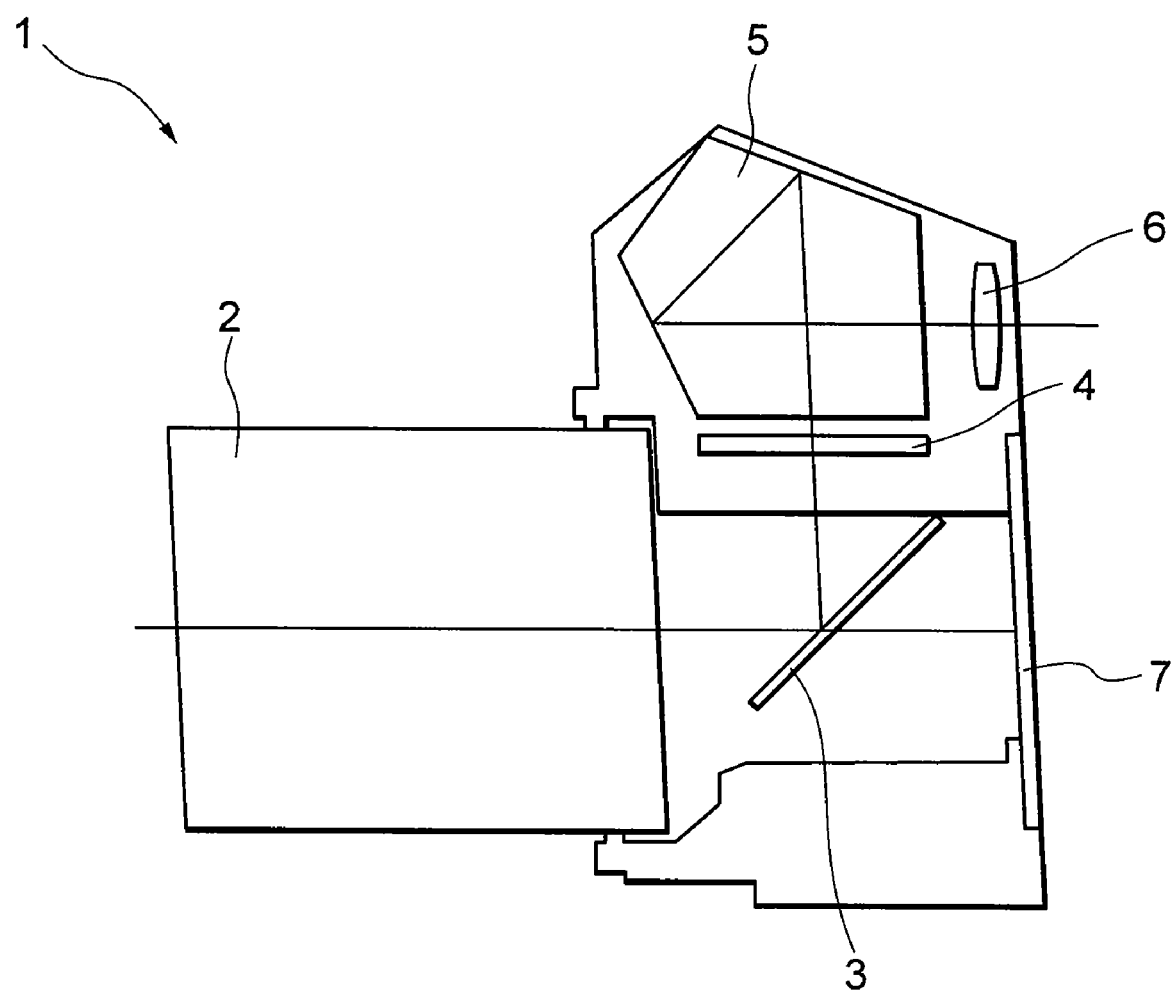
FIG. 17 is a diagram showing an imaging apparatus equipped with a close-up lens according to Example 1.

FIG. 17 is a diagram showing an imaging apparatus (camera) equipped with a close-up lens according to Example 1.

As shown in FIG. 17, the camera 1 is a single-lens reflex digital camera equipped with the close-up lens according to Example 1 as an image-taking lens 2.

In the camera 1, light emitted from a subject (not shown) is converged by the image-taking lens 2, and focused on a focusing screen 4 through a quick return mirror 3. The subject image focused on the focusing screen 4 is reflected a plurality of times by a pentagonal roof prism 5, and led to an eyepiece 6. Therefore, a photographer can observe the subject image as an erected image through the eyepiece 6.

When the photographer presses a shutter release button (not shown), the quick return mirror 3 is removed from an optical path, and the light from the subject (not shown) reaches an imaging device 7.

Light from the subject is captured by the imaging device 7 and stored in a memory (not shown) as a subject image. In this manner, the photographer can take a picture of the subject by the camera 1.

As shown in Example 1, the close-up lens according to Example 1 of the embodiment attached to the camera 1 as an image-taking lens 2 makes it possible to realize a close-up lens with superb optical performance capable of focusing from infinity to a close distance allowing a life-size magnification by an internal focusing system with small moving amounts of focusing lens groups. Accordingly, the camera 1 makes it possible to realize an imaging apparatus capable of taking a close-up photograph by focusing from infinity to a close distance allowing a life-size magnification by an internal focusing system.

Although the above-described example is shown a case composing a camera 1 equipped with the close-up lens according to Example 1, it is needless to say that the similar effect can be obtained by a camera equipped with a close-up lens according to any one of Examples 2 through 8 of the present embodiment.

The present embodiment only shows a specific example for the purpose of better understanding of the present invention. Accordingly, it is needless to say that the invention in its broader aspect is not limited to the specific details and representative devices shown and described herein, and various modifications may be made without departing from the spirit or scope of the general inventive concept as defined by the appended claims and their equivalents.

What is claimed is:

1. A close-up lens comprising four lens groups, and capable of focusing an object with an imaging magnification from β=0 through at least β=−1.0;
   wherein upon focusing, a first lens group and a fourth lens group are fixed with respect to an image plane, and a second lens group and a third lens group are moved along an optical axis; and
   the following conditional expressions being satisfied:

$$1.5 < \beta 0 < 2.3$$

$$0.3 < \beta 1 < 0.9$$

where β denotes a lateral magnification of the close-up lens in the entirety thereof, β0 denotes a lateral magnification of the second lens group upon focusing on infinity, and β1 denotes a lateral magnification of the second lens group upon an imaging magnification β=−1.0.

2. The close-up lens according to claim 1, wherein at least one aspherical surface is included in the close-up lens.

3. The close-up lens according to claim 1, wherein the first lens group is composed of three lenses or less.

4. The close-up lens according to claim 1, wherein the fourth lens group is composed of at least three lenses or more.

5. The close-up lens according to claim 1, wherein the first lens group includes at least one aspherical surface.

6. The close-up lens according to claim 1, wherein the second lens group includes at least one aspherical surface.

7. An imaging apparatus equipped with the close-up lens according to claim 1.

8. A method for focusing a close-up lens capable of focusing an object with an imaging magnification from β=0 through at least β=1.0, the method comprising steps of:
   providing the close-up lens including four lens groups;
   fixing a first lens group and a fourth lens group with respect to an image plane upon focusing; and
   moving a second lens group and a third lens group along an optical axis upon focusing; and
   satisfying the following conditional expressions:

$$1.5 < \beta 0 < 2.3$$

$$0.3 < \beta 1 < 0.9$$

where β denotes a lateral magnification of the close-up lens in the entirety thereof, β0 denotes a lateral magnification of the second lens group upon focusing on infinity, and 131 denotes a lateral magnification of the second lens group upon the imaging magnification β=−1.0.

9. The method according to claim 8, further including a step of:
   including at least one aspherical surface in the close-up lens.

* * * * *